(12) United States Patent
Sako et al.

(10) Patent No.: US 8,681,256 B2
(45) Date of Patent: Mar. 25, 2014

(54) DISPLAY METHOD AND DISPLAY APPARATUS IN WHICH A PART OF A SCREEN AREA IS IN A THROUGH-STATE

(75) Inventors: Yoichiro Sako, Tokyo (JP); Masaaki Tsuruta, Tokyo (JP); Taiji Ito, Kanagawa (JP); Masamichi Asukai, Kanagawa (JP); Kan Ebisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/445,477

(22) PCT Filed: Oct. 12, 2007

(86) PCT No.: PCT/JP2007/070397
§ 371 (c)(1),
(2), (4) Date: Sep. 21, 2009

(87) PCT Pub. No.: WO2008/047889
PCT Pub. Date: Apr. 24, 2008

(65) Prior Publication Data
US 2010/0085462 A1 Apr. 8, 2010

(30) Foreign Application Priority Data
Oct. 16, 2006 (JP) .................................. 2006-281042

(51) Int. Cl.
*H04N 5/222* (2006.01)

(52) U.S. Cl.
USPC ..................................... 348/333.02; 348/115

(58) Field of Classification Search
USPC ................................ 348/333.01–333.12, 115
See application file for complete search history.

(56) References Cited

U.S. PATENT DOCUMENTS

| 5,905,525 | A | 5/1999 | Ishibashi et al. |
| 5,978,015 | A | 11/1999 | Ishibashi et al. |
| 6,037,914 | A | 3/2000 | Robinson |
| 2002/0130953 | A1 | 9/2002 | Riconda et al. |
| 2002/0154142 | A1 | 10/2002 | Thomason |
| 2002/0190923 | A1* | 12/2002 | Ronzani et al. ................. 345/50 |
| 2004/0104864 | A1 | 6/2004 | Nakada |

(Continued)

FOREIGN PATENT DOCUMENTS

| CA | 2 270 003 A1 | 11/1999 |
| CN | 1510910 A | 7/2004 |

(Continued)

OTHER PUBLICATIONS

Machine English Translation of JP 2005-172851 A (Jun. 30, 2005).*

(Continued)

*Primary Examiner* — Nelson D. Hernández Hernández
(74) *Attorney, Agent, or Firm* — Oblon, Spivak, McClelland, Maier & Neustadt, L.L.P.

(57) ABSTRACT

Display control that extends a user's visual ability is accomplished. By wearing an eyeglass-type or headgear-type mounting unit, he or she is allowed to see display means disposed in front of his or her eyes. By causing a part of a screen area of the display means to be in a through-state and a display with a display image signal to be executed, the user can see an image of a scene different from a scene that he or she ordinarily sees with a display of the display image signal while he or she can see the ordinary visual scene with the through-state area.

21 Claims, 15 Drawing Sheets

(56) References Cited

U.S. PATENT DOCUMENTS

| | | | |
|---|---|---|---|
| 2004/0108981 A1 | 6/2004 | El Sayed et al. | |
| 2004/0189675 A1* | 9/2004 | Pretlove et al. | 345/633 |
| 2004/0227703 A1* | 11/2004 | Lamvik et al. | 345/76 |
| 2005/0088365 A1* | 4/2005 | Yamazaki et al. | 345/8 |
| 2005/0206583 A1* | 9/2005 | Lemelson et al. | 345/7 |
| 2006/0152434 A1 | 7/2006 | Sauer et al. | |
| 2007/0003162 A1 | 1/2007 | Miyoshi et al. | |
| 2008/0088646 A1 | 4/2008 | Sako et al. | |
| 2008/0122931 A1* | 5/2008 | Simbirski et al. | 348/157 |
| 2008/0136916 A1* | 6/2008 | Wolff | 348/169 |
| 2008/0259199 A1 | 10/2008 | Sako et al. | |

FOREIGN PATENT DOCUMENTS

| | | |
|---|---|---|
| CN | 1639726 A | 7/2005 |
| GB | 2 378 075 A | 1/2003 |
| JP | U HEI 02-026870 | 2/1990 |
| JP | 8 126031 | 5/1996 |
| JP | 8 163526 | 6/1996 |
| JP | 9 27970 | 1/1997 |
| JP | 9 185009 | 7/1997 |
| JP | 11-249588 | 9/1999 |
| JP | 11-341399 | 12/1999 |
| JP | A 2001-356836 | 12/2001 |
| JP | 2002 44683 | 2/2002 |
| JP | 2003-216982 | 7/2003 |
| JP | 2003 244728 | 8/2003 |
| JP | 2004-198288 A | 7/2004 |
| JP | 2005-509129 | 4/2005 |
| JP | 2005 172851 | 6/2005 |
| JP | 2005-172851 | 6/2005 |
| JP | A 2005-157317 | 6/2005 |
| JP | A 2005-173748 | 6/2005 |
| JP | 2005 269010 | 9/2005 |
| JP | 2006 67139 | 3/2006 |
| JP | A2006-165822 | 6/2006 |
| JP | A 2006-171302 | 6/2006 |
| JP | 2006-208687 A | 8/2006 |
| WO | 02 073535 | 9/2002 |
| WO | WO 2004/113991 A2 | 12/2004 |

OTHER PUBLICATIONS

U.S. Appl. No. 11/978,407, filed Oct. 29, 2007, Sako, et al.
U.S. Appl. No. 11/860,969, filed Sep. 25, 2007, Sako, et al.
European Search Report issued Jul. 26, 2011, in Patent Application No. 07830131.4.
Japanese Office Action issued Apr. 17, 2012, in Patent Application No. 2006-281042.
U.S. Appl. No. 13/564,439, filed Aug. 1, 2012, Sako, et al.
U.S. Appl. No. 13/567,547, filed Aug. 6, 2012, Sako et al.
Office Action issued Sep. 11, 2012 in Japanese Patent Application No. 2006-281042.
Chinese Office Action issued Feb. 1, 2012 in Chinese Appln. No. 200780043163.6 (with English translation).
English Translation of Office Action in a foreign counterpart—Patent Application No. 2012-262182, Dispatch Date Oct. 1, 2013.
Office Action issued Jan. 8, 2014, in Korean Patent Application No. 2009-7010005 (with English Translation).

* cited by examiner

THROUGH

IMAGE IS DISPLAYED ON AR2

THROUGH

IMAGE IS DISPLAYED ON AR2

IMAGE IS DISPLAYED ON AR2

IMAGES ARE DISPLAYED ON AR2 AND AR3

DISPLAY METHOD AND DISPLAY APPARATUS IN WHICH A PART OF A SCREEN AREA IS IN A THROUGH-STATE

TECHNICAL FIELD

The present invention relates to a display apparatus and a display method that display an image in front of the eyes of the user who is wearing, for example, an eyeglass-type or headgear-type mounting unit.

BACKGROUND ART

Various types of apparatus that use an eyeglass-type or headgear-type mounting unit having display sections that are disposed in front of the eyes of the user and display an image have been proposed, for example, in Japanese Patent Application Laid-Open Publication No. HEI 8-126031, Japanese Patent Application Laid-Open Publication No. HEI 9-27970, and Japanese Patent Application Laid-Open Publication No. HEI 9-185009.

However, apparatus that control image capturing and displaying from view points of aiding of user's visual sense and improvement of his or her visual ability have not been known.

DISCLOSURE OF THE INVENTION

Therefore, an object of the present invention is to accomplish aiding and improvement of user's visual sense.

A display apparatus of the present invention includes display means, disposed in front of eyes of a user, for displaying an image and causing a screen area on which an image is displayed to be in a through-state which is transparent or semi-transparent; image signal generation means for generating a display image signal of a scene different from a scene which the user sees through the display means when the display means is caused to be in the through-state; and control means for controlling a part of the screen area of the display means to be in the through-state and the display means to execute displaying with the display image signal generated by the image signal generation means.

The image signal generation means includes an image capturing section; and a signal processing section which performs a signal process for a captured image signal obtained by the image capturing section.

In this case, the image capturing section is an image capturing section disposed such that the image capturing section performs capturing in a direction which the user sees through the display means when the screen area is caused to be in the through-state as a direction of an object.

The image capturing section can be an image capturing section disposed such that the image capturing section performs capturing in a direction different from a direction which the user sees through the display means when the screen area is caused to be in the through-state as a direction of an object.

Instead, the image capturing section is an image capturing section capable of changing a direction of an object.

Instead, the image signal generation means includes a reception section which receives an image signal from an external device.

Instead, the image signal generation means includes a signal processing section which performs a signal process for a supplied image signal.

Instead, the control means sets a parent screen area and a child screen area in the screen area of the display means and causes one of the parent screen area and the child screen area to be in the through-state and the other to be in a screen display state with the display image signal.

Instead, the control means divides the screen area of the display means into areas and causes one of the divided areas to be in the through-state and the other to be in an image display state with the display image signal.

Instead, the display image signal is an image signal obtained by capturing of an image of a near scene or an image of a far scene.

Instead, the display image signal is an image signal obtained by capturing of a telescopic image or a wide-angle image.

Instead, the display image signal is an image signal obtained by an enlargement process or a reduction process.

Instead, the display image signal is an image signal obtained by capturing whose image capturing sensitivity is increased or decreased.

Instead, the display image signal is an image signal obtained by capturing whose infrared image capturing sensitivity is increased.

Instead, the display image signal is an image signal obtained by capturing whose ultraviolet image capturing sensitivity is increased.

Instead, the display image signal is an image signal obtained by capturing in a direction different from a direction which the user sees through the display means when the screen area is caused to be in the through-state as a direction of an object.

Instead, the image capturing section controls an operation of an image capturing lens system such that the image signal generation means obtains a display image signal as a scene different from a scene which the user sees when the display means is caused to be in the through-state.

Instead, the signal processing section performs a signal process such that the image signal generation means obtains a display image signal as a scene different from a scene which the user sees when the display means is caused to be in the through-state.

Instead, the receiving section receives an image signal captured by an external image capturing device such that the image signal generation means obtains the display image signal as a scene different from a scene which the user sees when the display means is caused to be in the through-state.

Instead, the display apparatus further includes external information obtaining means for obtaining external information. The control means causes the display image signal to be displayed on the display means based on the external information obtained from the external information obtaining means.

Instead, the control means controls an area on which the display image signal is displayed based on the external information obtained from the external information obtaining means.

A display method of the present invention is a display method of a display apparatus having display means, disposed in front of eyes of a user, for displaying an image and causing a screen area on which an image is displayed to be in a through-state which is transparent or semi-transparent, including a step of generating a display image signal of a scene different from a scene which the user sees through the display means when the display means is caused to be in the through-state; and a step of controlling a part of the screen area of the display means to be in the through-state and the display means to execute displaying with the generated display image signal.

According to the present invention, when the user wears the display apparatus, for example, as an eyeglass-type or head-gear type mounting unit, he or she is caused to see display means disposed in front of his or her eyes. The display means can be caused to be in the through-state.

By causing a part of the screen of the display means to be in the through-state and a display image signal generated by image signal generation means to be displayed, while being caused to see an ordinary visual scene in the through-state area, the user can see an image of a scene different from the ordinary visual scene with the display of the display image signal. For example, while seeing ahead with the through-state area, the user can see a telescopic image, an enlarged image, a specially captured image, an image of a rear scene, and so forth with a display of the display image signal.

In other words, since the user is caused to see a scene that he or she cannot see with his or her ordinary visual sense together with his or her ordinary visual scene, the visual ability is caused to be extended.

BEST MODES FOR CARRYING OUT THE INVENTION

Next, the display apparatus and display method according to the present invention will be described in the following order.
[1. Exemplary appearance of display apparatus and relationship with external device]
[2. Exemplary structure of display apparatus]
[3. Areas on screen]
[4. Exemplary display operation]
[5. Exemplary operation triggers]
[6. Effect of embodiment, exemplary modification, and exemplary extension]

[1. Exemplary Appearance of Display Apparatus and Relationship with External Device]

Figure 1A:
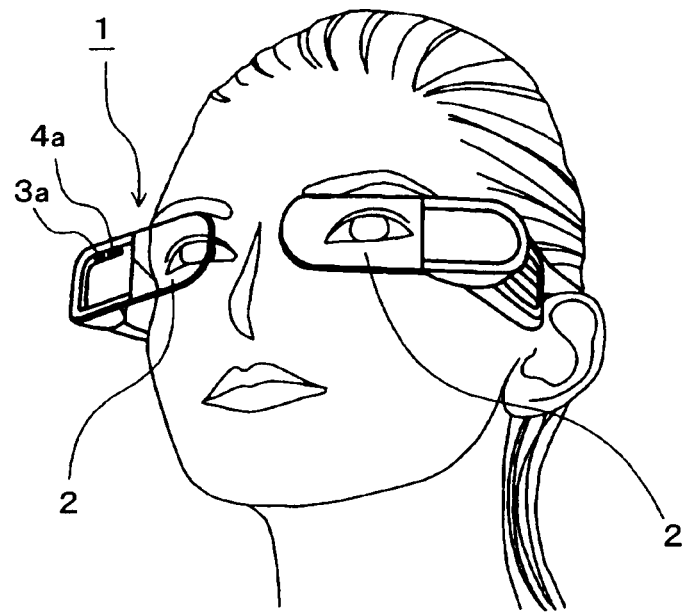
FIG. 1A and FIG. 1B are explanatory diagrams of exemplary appearances of a display apparatus of an embodiment of the present invention.
Figure 1B:
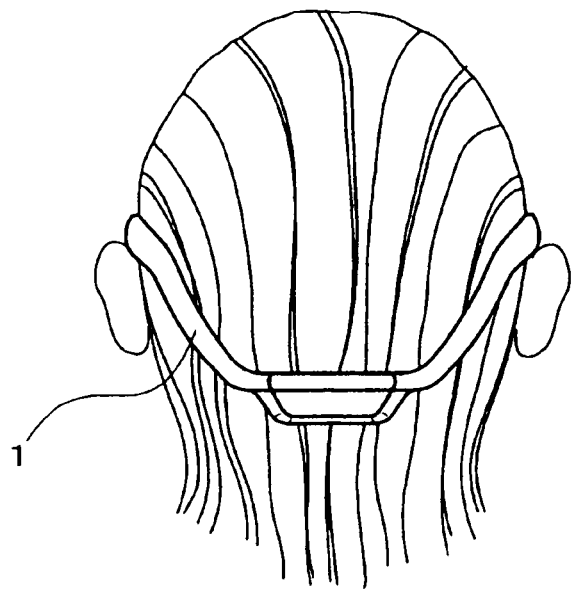

As an embodiment, FIG. 1A and FIG. 1B show exemplary appearances of a display apparatus 1 that is an eyeglass-type display. The display apparatus 1 has a mounting unit that is formed in a half-circumferential frame that fits bilateral temporal regions and a occipital region of the user, for example, as shown in FIG. 1B and the display apparatus 1 is worn by the user in such a manner that the mounting unit is hung on both his or her conchae as shown in FIG. 1A.

When the display apparatus 1 is worn by the user, a pair of display sections 2, 2 for the left and right eyes are disposed immediately in front of both his or her eyes, namely at the lens positions of ordinary eyeglasses. The respective display sections 2 are, for example, composed of liquid crystal panels and by controlling their transmittances the display sections 2 can be caused to be in the through-state, namely transparent or semitransparent state as shown in the drawing. When the display sections 2 are caused to be in the through-state, even if the user wears the display apparatus 1 all times like eyeglasses, it does not affect his or her ordinary life.

While the user is wearing the display apparatus 1, an image capturing lens 3a is disposed in the forward direction of the user. In this case, the image capturing lens 3a is caused to capture an image in the direction that the user sees through the display sections 2 as the direction of the object when they are caused to be in the through-state.

In addition, a light emission section 4a that lights up the image capturing direction of the image capturing lens 3a is disposed. The light emission section 4a is composed, for example, of an LED (Light Emitting Diode).

Since FIG. 1A and FIG. 1B are just exemplary, it can be contemplated that there are many structures in which the user wears the display apparatus 1, generally as long as the display apparatus 1 is an eyeglass-type or headgear-type mounting unit and at least according to this embodiment, the display sections 2 are disposed immediately in front of the eyes of the user. In addition, as well as the structure in which the display sections 2 are disposed corresponding to both the eyes of the user, one display section 2 may be disposed for one eye of the user.

It can be contemplated that the light emission section 4a is not provided.

In FIG. 1A, although the image capturing lens 3a is disposed such that the direction of the object is the forward direction of the user, the image capturing lens 3a may be disposed such that when the display sections 2 are caused to be in the through-state, the direction of the object is different from the direction that user sees through the display sections 2.

Figure 2A:
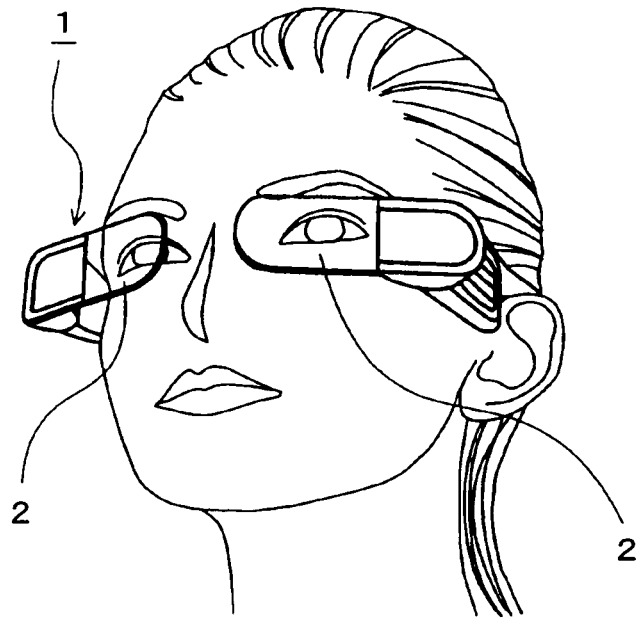
FIG. 2A and FIG. 2B are explanatory diagrams of other exemplary appearances of a display apparatus of an embodiment.
Figure 2B:
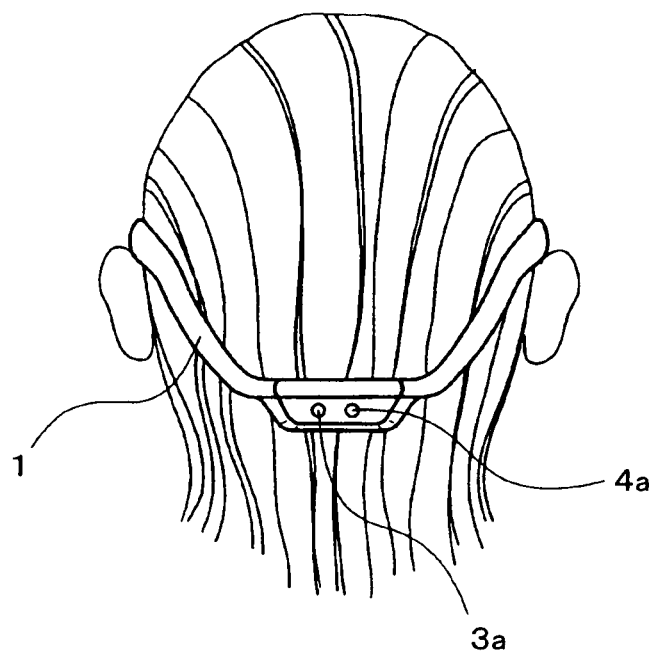

FIG. 2A and FIG. 2B show an example. In the example shown in FIG. 2A and FIG. 2B, the image capturing lens 3a is not disposed in the forward direction, but the image capturing lens 3a and the light emission section 4a are mounted on a unit disposed on the rear head side. In other words, in this case, the image capturing lens 3a is caused to capture an image in the backward direction that the user cannot ordinarily see.

Although not shown, the image capturing lens 3a may be disposed such that the direction of the object is the upward direction, left side direction, right side direction, downward direction, or the like of the user.

In the examples shown in FIG. 1A and FIG. 2B, since the image capturing lens 3a is fixedly mounted, the direction of the object is fixed when an image thereof is captured (in the forward direction or backward direction of the user). However, when the image capturing lens 3a is mounted through a moving mechanism that can change the direction of the object, it can be changed manually or automatically when an image is captured.

In FIG. 1A and FIG. 2B, although one image capturing functional block is disposed as the image capturing lens 3a, a plurality of image capturing lenses 3a may be mounted so as to provide a plurality of image capturing functional blocks.

An image signal captured by an image capturing functional system, including the image capturing lens 3a, which will be described later, is processed in a predetermined manner and the resultant display image signal is displayed on the display sections 2 through a predetermined process.

In this case, a partial area of the screen of each of the display sections 2 is caused to be in the through-state and an image based on the display image signal is displayed on another area.

Although an exemplary internal structure will be described later, it can be contemplated that the display apparatus 1 has a communication function that communicates with an external device (a communication section 26 shown in FIG. 5).

Thus, the sources of the display image signals displayed on the display sections 2 are supposed to be not only the image capturing functional block including the image capturing lens 3a but also the communication functional section. In other words, an image signal transmitted from another image capturing device or the like as an external device can be received by the communication functional section and displayed on the display sections 2.

Figure 3A:
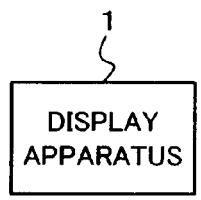
FIG. 3A, FIG. 3B, and FIG. 3C are explanatory diagrams of the relationship between a display apparatus of the embodiment and external devices.
Figure 3B:
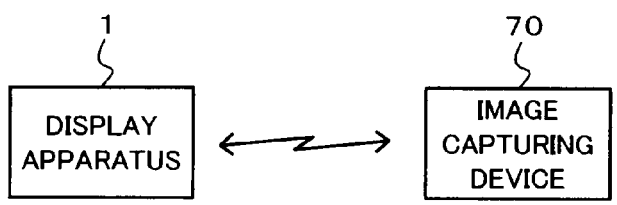
Figure 3C:
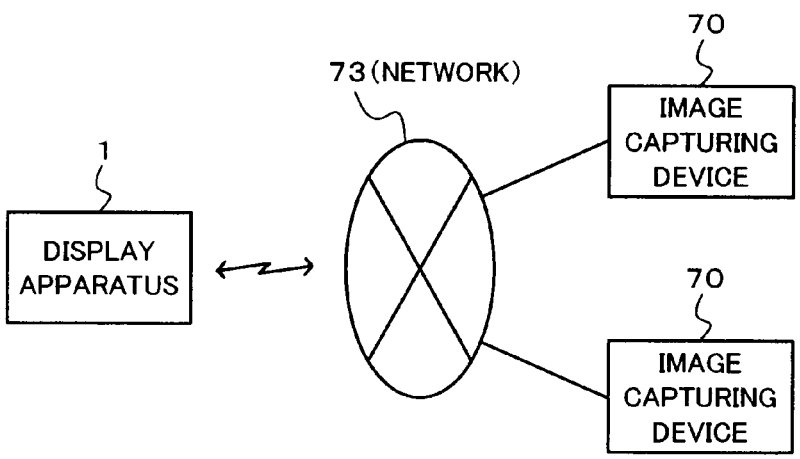

FIG. 3A, FIG. 3B, and FIG. 3C show exemplary modes of usage of the display apparatus 1 in association with external devices.

FIG. 3A shows the case in which the display apparatus 1 is used alone. In this case, since the display apparatus 1 has an image capturing function, a display image signal generated from a captured image signal as a source can be displayed on the display sections 2.

FIG. 3B shows an example in which the display apparatus 1 has a communication function and communicates with an external image capturing device 70. In this case, the display apparatus 1 receives an image captured by the image capturing device 70 and causes the display sections 2 to display the image. A video camera, a digital camera, or the like that has a communication function can be supposed to be the external image capturing device 70 and instead, as shown in FIG. 1A and FIG. 1B, the display apparatus 1 having an image capturing function can be contemplated to be an external image capturing device 70 for the display apparatus 1.

In addition, the external image capturing device 70 can be contemplated to be various types such as an image capturing device that belongs to the user of the display apparatus 1, an image capturing device that belongs to an acquaintance of the user of the display apparatus 1, and an image capturing device that belongs to a public or private company that provides an image and that can communicate with the display apparatus 1.

FIG. 3C shows an example in which the display apparatus 1 is provided with a communication function, in particular, a communication access function through a network 73 such as the Internet so as to communicate with the external image capturing device 70 connected through the network 73. In this case, the display apparatus 1 receives a captured image signal through the network 73 and causes the display sections 2 to display an image with a display image signal based on the received captured image signal.

[2. Exemplary Structure of Display Apparatus]

Figure 4:
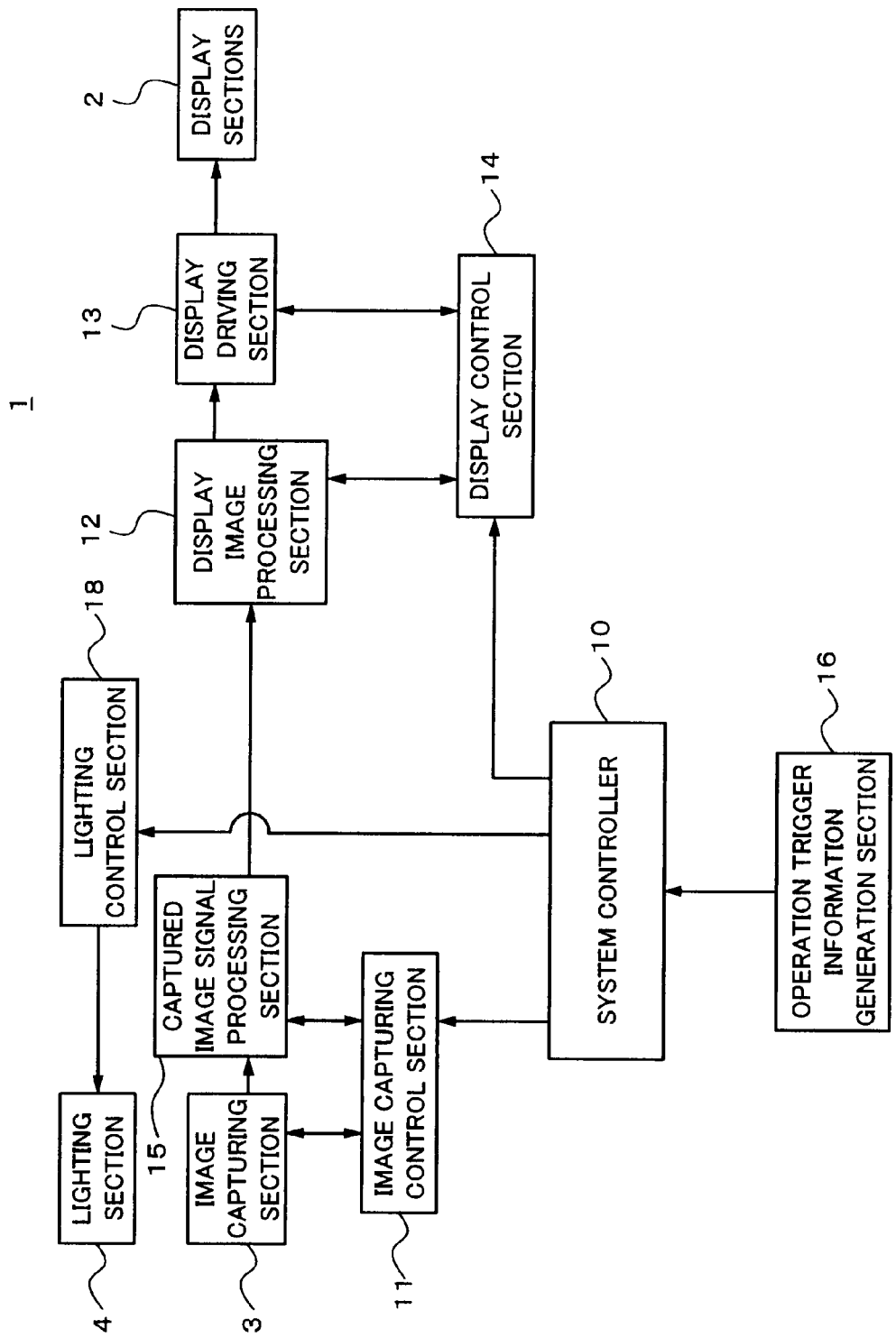
FIG. 4 is a block diagram showing a display apparatus of an embodiment.

FIG. 4 shows an exemplary internal structure of a display apparatus 1.

A system controller 10 is composed of a microcomputer that includes, for example, a CPU (Central Processing Unit), a ROM (Read Only Memory), a RAM (Random Access Memory), a nonvolatile memory section, and an interface section and is a control section that controls all the sections of the display apparatus 1.

The system controller 10 controls each section of the display apparatus 1 based on an internal operation program and an operation trigger received from the operation trigger information generation section 16 and causes the display sections 2 to display a predetermined image.

Disposed in the display apparatus 1 are an image capturing section 3, an image capturing control section 11, and a captured image signal processing section 15.

The image capturing section 3 includes a lens system having the image capturing lens 3a shown in FIG. 1A or FIG. 2B, a diaphragm, a zoom lens, a focus lens, and so forth, a driving system that causes the lens system to perform a focus operation and a zoom operation, a solid state image sensor array that detects light of a captured image obtained by the lens system, converts light into electricity, and generates a captured image signal corresponding to the electricity, and so forth. The solid state image sensor array is composed, for example, of a CCD (Charge Coupled Device) sensor array or a CMOS (Complementary Metal Oxide Semiconductor) sensor array.

In the case of the example of FIG. 1A and FIG. 1B, the image capturing section 3 captures an image of a scene in the forward direction of the user, whereas in the case of the example of FIG. 2A and FIG. 2B, the image capturing section 3 captures an image of a scene in his or her backward direction.

The captured image signal processing section 15 includes a sample hold/AGC (Automatic Gain Control) circuit that adjusts the gain of and trims the waveform of the signal obtained by the solid state image sensor array of the image capturing section 3 and a video A/D converter and obtains a captured image signal as digital data. The captured image signal processing section 15 performs a white balance process, a luminance process, a color signal process, a vibration correction process, and so forth for the captured image signal.

The image capturing control section 11 controls the operations of the image capturing section 3 and the captured image signal processing section 15 based on commands received from the system controller 10. The image capturing control section 11 controls, for example, turning-on and off the operations of the image capturing section 3 and the captured image signal processing section 15. In addition, the image capturing control section 11 is contemplated to control (control of motors of) the image capturing section 3 to perform an auto focus operation, an automatic exposure adjustment operation, an aperture adjustment operation, a zoom operation, and so forth.

When the moving mechanism that can change the direction of the object of the image capturing lens 3a is provided, the image capturing control section 11 controls the moving mechanism to change the direction of the image capturing lens 3a of the image capturing section 3 under the control of the system controller 10.

In addition, the image capturing control section 11 includes a timing generator and controls signal process operations of the sample hold/AGC circuit and the video A/D converter of the solid state image sensor array and the image capturing control section 11 with a timing signal generated by the timing generator. In addition, the image capturing control section 11 can perform the timing control to change the frame rate of a capturing image.

In addition, the image capturing control section 11 controls the image capturing sensitivity and the signal process of the solid state image sensor array and the captured image signal processing section 15. To control an image capturing sensitivity, the image capturing control section 11 controls, for example, the gain of the signal that has been read from the solid state image sensor array, black level setting, various types of coefficients of digital data of the captured image signal process, a correction amount of the vibration correction process, and so forth. With respect to image capturing sensitivity, the image capturing control section 11 can perform an overall sensitivity adjustment regardless of a wavelength band and specific sensitivity adjustments for specific wavelength bands (for example, image capturing by eliminating a specific wavelength band) such as an infrared region and an ultraviolet region. The wavelength specific sensitivity adjustment can be performed by inserting a wavelength filter into the image capturing lens system or by performing a wavelength filter calculation process for the captured image signal. In these cases, the image capturing control section 11 can control the image capturing sensitivity, for example, by inserting a wavelength filter and/or designating a filter calculation coefficient.

As a structure that displays data to the user, the display apparatus 1 includes the display sections 2, a display image processing section 12, a display driving section 13, and a display control section 14.

A captured image signal that has been captured by the image capturing section 3 and then processed by the captured image signal processing section 15 is supplied to the display image processing section 12. The display image processing section 12 is, for example, a so-called video processor and executes various types of display processes for the supplied captured image signal.

The display image processing section 12 can perform, for example, a luminance level adjustment, a color correction, a contrast adjustment, a sharpness (edge enhancement) adjustment, and so forth for the captured image signal. In addition, the display image processing section 12 can, for example, generate an enlarged image of which a part of a captured image signal is enlarged or a reduced image, perform image effect processes such as soft focus, mosaic, luminance inversion, partial image highlight display (emphasized display), change of entire color atmosphere, separate a captured image for a multiply separated display, combine a plurality of captured images, perform a process of generating a character image and a graphic image, and superimpose a generated image with a captured image. In other words, the display image processing section 12 can perform various types of processes for a digital image signal as a captured image signal.

The display driving section 13 is composed of a pixel driving circuit that displays an image signal supplied from the display image processing section 12 on the display sections 2, which are for example liquid crystal displays. In other words, the display driving section 13 applies a driving signal based on the image signal to each pixel formed in a matrix shape in the display sections 2 at predetermined horizontal/vertical drive timings to cause the display sections 2 to display an image. In addition, the display driving section 13 controls the transmittance of each pixel of the display sections 2 to cause the entire surface and a part thereof to be in the through-state.

The display control section 14 controls the process and operation of the display image processing section 12 and the operation of the display driving section 13 corresponding to commands received from the system controller 10. In other words, the display control section 14 causes the display image processing section 12 to execute the foregoing various types of processes. In addition, the display control section 14 controls the display driving section 13 to cause the display sections 2 to switch the display state between the through-state and the image display state.

In addition, the lighting section 4 and a lighting control section 18 are provided. The lighting section 4 is composed of the light emission section 4a (for example, an LED) shown in FIG. 1A and FIG. 2B and a light emission circuit that causes the light emission section 4a to emit light. The lighting control section 18 causes the lighting section 4 to execute a light emission operation corresponding to a command supplied from the system controller 10.

Since the light emission section 4a of the lighting section 4 has been mounted as shown in FIG. 1A or FIG. 2B, the lighting section 4 performs a lighting operation in the direction of the object of the image capturing lens 3a.

The operation trigger information generation section 16 generates operation triggers that cause the display sections 2, for example, to start/stop displaying of an image and switch the display modes.

The operation trigger information generation section 16 can be composed of operation switches as operation keys or operation dials that the user controls and an operation detection mechanism that detects the operations of the operation switches. In other words, user's manual operations are operation trigger information of various types of operations. The operation trigger information generation section 16 supplies user's operation information as operation trigger information to the system controller 10 to control a display operation corresponding to the user's operation.

In addition, the operation trigger information generation section 16 may be structured such that it can detect user's information (detected information of user's visual situation, body action, vital situation, and so forth) and external information (detected information of environmental situation of the display apparatus, place, date/time, situation of object, and so forth). For example, the system controller 10 may determine whether or not an operation trigger has occurred based on these user's information and external information. Examples of the user's information and external information will be described later.

Figure 5:
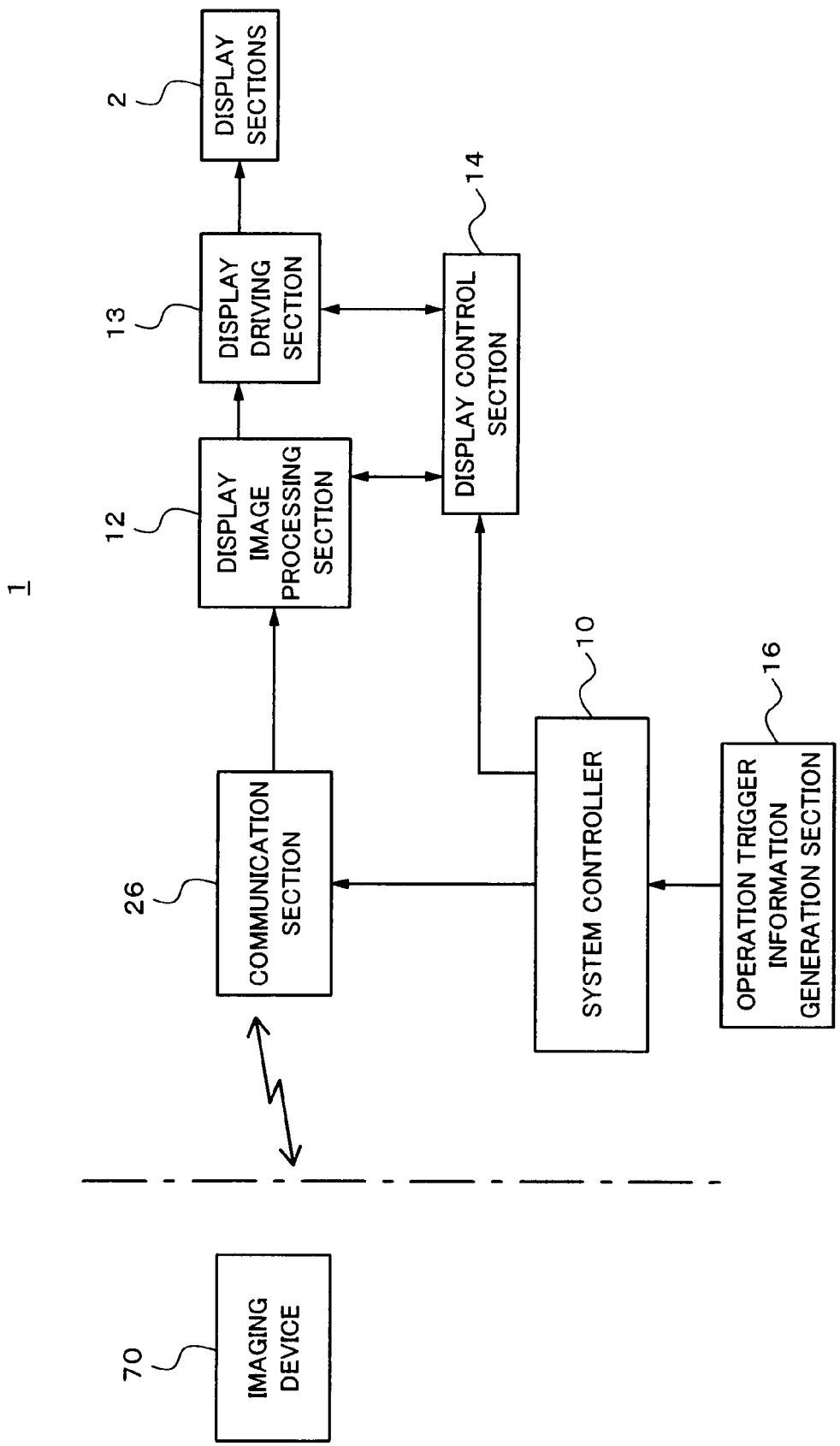
FIG. 5 is another block diagram of a display apparatus of an embodiment.

FIG. 5 shows another exemplary structure of the display apparatus 1. Blocks having the same functions as those shown in FIG. 4 are denoted by the same reference numerals and their redundant description will be omitted.

The structure shown in FIG. 5 is not provided with the image capturing functional block (image capturing section 3, image capturing control section 11, and captured image signal processing section 15) and the lighting section 4, and the lighting control section 18, but with a communication section 26.

The communication section 26 transmits and receives data to and from an external device. The external device can be contemplated to be one of various types of devices including the image capturing device 70 described with reference to FIG. 3B and FIG. 3C.

The communication section 26 may be structured such that it performs a network communication through a near range radio communication, for example, to a network access point according to radio LAN (Local Area Network) system, Bluetooth (registered trademark) system, or the like or performs a direct radio communication with an external device having a corresponding communication function.

In the example shown in FIG. 5, the communication section 26 communicates with an external image capturing device 70 as described with reference to FIG. 3B or FIG. 3C and receives a captured image signal therefrom. The communication section 26 supplies the received captured image signal to a display image processing section 12. An image signal processed in the display image processing section 12 is supplied to a display driving section 13 and displayed on the display sections 2.

Figure 6:
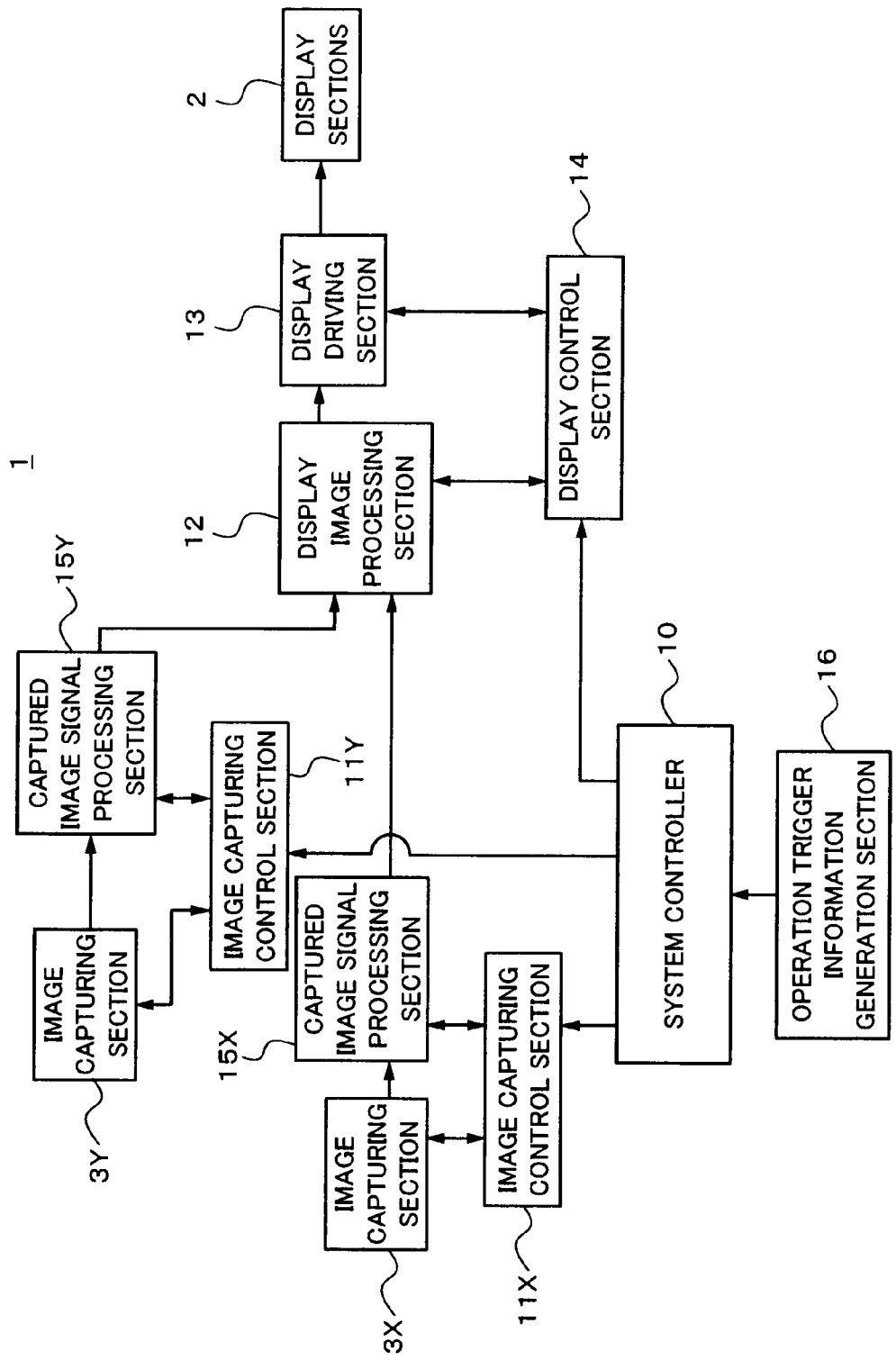
FIG. 6 is a still another block diagram of a display apparatus of an embodiment.

FIG. 6 shows another exemplary structure of the display apparatus 1. The similar blocks to those shown in FIG. 4 are denoted by the similar reference numerals and their redundant description will be omitted.

The structure shown in FIG. 6 has two image capturing functional blocks (each of which includes image capturing section 3, image capturing control section 11, and captured image signal processing section 15) in the structure shown in FIG. 4.

In other words, a first image capturing functional block composed of an image capturing section 3X, an image capturing control section 11X, and a captured image signal processing section 15X and a second image capturing functional block composed of an image capturing section 3Y, an image capturing control section 11Y, and a captured image signal processing section 15Y are provided.

The image capturing sections 3X and 3Y may capture images in the same direction of an object or images in different directions of objects.

For example, the image capturing sections 3X and 3Y may be disposed such that they capture images in the forward direction. Instead, the image capturing sections 3X and 3Y may be disposed such that the image capturing section 3X captures an image in the forward direction and the image capturing section 3Y captures an image in the backward direction. Instead, the image capturing sections 3X and 3Y may be disposed such that the image capturing section 3X captures an image in the right backward direction and the image capturing section 3Y captures an image in the left backward direction. Instead, the image capturing sections 3X and 3Y may be disposed such that the image capturing section 3X captures an image in the downward direction and the image capturing section 3Y captures an image in the upward direction.

Captured image signals obtained by the individual image capturing functional blocks are processed by a display image processing section 12, supplied to a display driving section 13, and then displayed on display sections 2.

Although exemplary structures of the display apparatus 1 have been shown in FIG. 4, FIG. 5, and FIG. 6, the display apparatus 1 may be supposed to have more various structures.

For example, it can be contemplated that three or more image capturing functional blocks are provided.

A communication section 26 that receives a captured image signal from an external image capturing device 70 can be contemplated to be provided along with one or a plurality of image capturing functional blocks.

In addition, the image capturing section 3 (image capturing lens 3a) in the image capturing functional block may be contemplated to be fixed in the direction of an object or movable therefrom. However, when a plurality of image capturing functional blocks are provided, it can be contemplated that all of them are fixed or movable or a part of them are fixed and the rest are movable.

However, in the structures shown in FIG. 4, FIG. 5, and FIG. 6 and their modifications, in the display apparatus 1 of this embodiment, an image signal processed in the display image processing section 12 and supplied to the display driving section 13 becomes a display image signal that is finally displayed on the display sections 2. In this example, especially a display image signal is a signal that causes an image to be displayed as a scene difference from a scene that the user sees through the display sections 2 that is caused to be in the through-state.

An image as a display image signal, namely, as a scene different from a scene that user sees through the display sections 2 that is caused to be in the through-state can be contemplated to be obtained in various manners.

For example, images captured by the image capturing section 3 (3X, 3Y) and an image received by the communication section 26 may be images as scenes different from a scene that the user sees through the display sections 2 or when an image as a scene that the user sees through the display sections 2 is processed in the captured image signal processing section 15 and the display image processing section 12 in predetermined manners, the resultant image may become an image as a scene different from a scene that he or she sees through the display sections 2.

Specific examples of images of scenes different from a scene that the user sees through the display sections 2 will be described later.

This example is based on such that when such an image is displayed, while a part of the screen area of each of the display sections 2 is caused to be in the through-state, an image corresponding to an image signal that is output from the display image processing section 12 is displayed. In other words, an image is displayed on a part of an area of each of the display sections 2 caused to be in the through-state.

[3. Areas on Screen]

Examples in which a part of the screen area of each of the display sections 2 is caused to be in the through-state and an image signal that is output from the display image processing section 12 is displayed are shown in FIG. 7A, FIG. 7B, FIG. 7C, FIG. 7D, FIG. 7E, and FIG. 7F, and FIG. 8A, FIG. 8B, FIG. 8C, and FIG. 8D.

In the display sections 2, in a mode in which an image is displayed while a through-state area is left, a parent screen area and a child screen area are set in the screen area, one of the parent screen area and the child screen area is set to the through-state, and the other is set to an image display state with a display image signal.

Instead, the screen area may be divided into an area that is the through-state and an area in which an image corresponding to a display image signal is displayed.

In FIG. 7A, FIG. 7B, FIG. 7C, FIG. 7D, FIG. 7E, FIG. 7F, and FIG. 8A, FIG. 8B, FIG. 8C, and FIG. 8D, it is assumed that an area AR1 is an area in the through-state and an area AR2 is an area in which an image corresponding to a display image signal is displayed.

Figure 7A:
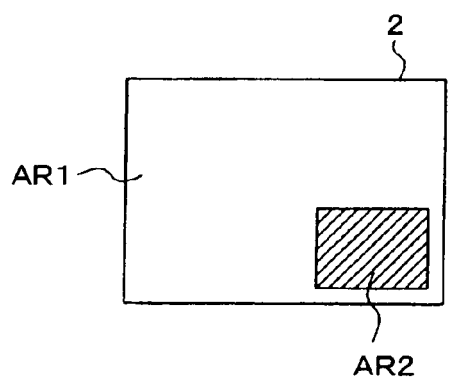
FIG. 7A, FIG. 7B, FIG. 7C, FIG. 7D, FIG. 7E, and FIG. 7F are explanatory diagrams of areas of display sections of an embodiment.

FIG. 7A shows an example in which the area AR2 in the screen area of each of the display sections 2 is set as a child screen at the lower right of the area AR1 and an image is displayed on the area AR2.

Figure 7B:
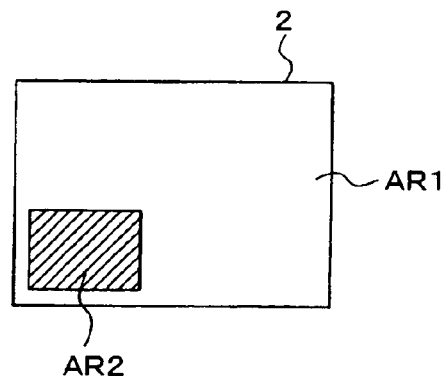

FIG. 7B shows an example in which the area AR2 in the screen area of each of the display sections 2 is set as a child screen at the lower left of the area AR1 and an image is displayed on the area AR2.

When the child screen is set in such a manner, the area AR2 may be set as the child screen at various positions such as upper right, upper left, center, rightward center, and leftward center (not shown).

Figure 7C:
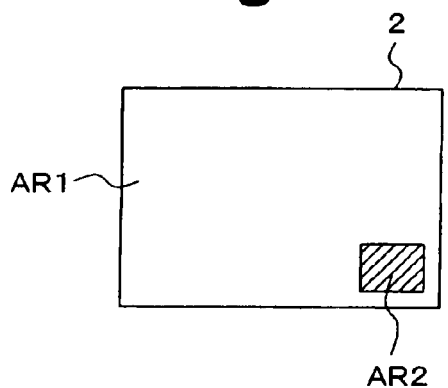

FIG. 7C shows an example in which the size of the area AR2 is decreased.

Figure 7D:
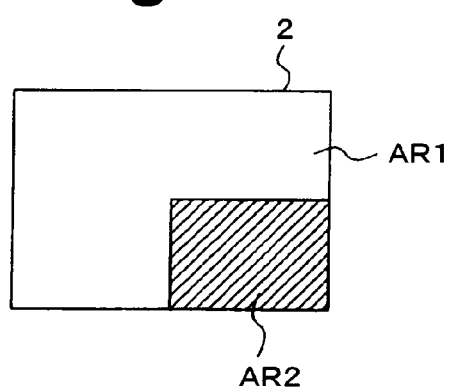

FIG. 7D shows an example in which the size of the area AR2 is increased.

Figure 7E:
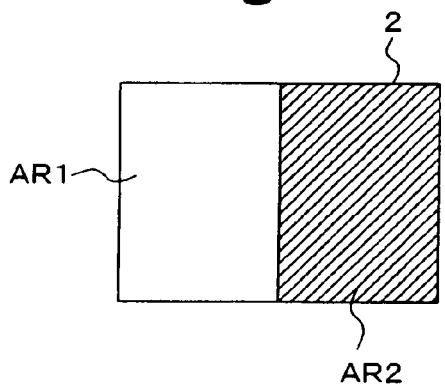

FIG. 7E shows an example in which the screen area of each of the display sections 2 is equally divided into the area AR1 and the area AR2 as left and right areas, respectively.

Figure 7F:
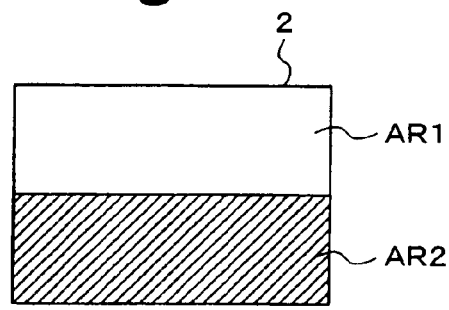

FIG. 7F shows an example in which the screen area of each of the display sections 2 is equally divided into the area AR1 and the area AR2 as upper and lower areas, respectively.

For example, in the structures shown in FIG. 4 and FIG. 5, when an image is displayed, while the area AR1 is caused to be in the through-state, it can be contemplated that the area AR2 is caused to display an image in one of the modes shown in FIG. 7A, FIG. 7B, FIG. 7C, FIG. 7D, FIG. 7E, and FIG. 7F.

Instead, the system controller 10 may select one of the area forms shown in FIG. 7A, FIG. 7B, FIG. 7C, FIG. 7D, FIG. 7E, and FIG. 7F to display an image or change them based on information (for example, user's operation information, information about the user, external information, and so forth) received from the operation trigger information generation section 16. For example, the system controller 10 can change the position of the area AR2 as the child screen as shown in FIG. 7A or FIG. 7B, change the size of the area AR2 as shown in FIG. 7C or FIG. 7D, or equally divide the display area, for example, according to a user's operation or the like such that the area AR2 is formed according to his or her preference.

Instead, it can be contemplated that the area AR1 and the area AR2 shown in FIG. 7A, FIG. 7B, FIG. 7C, FIG. 7D, FIG. 7E, and FIG. 7F are caused to display an image and to be in the through-state, respectively, as so-called display area switching.

Figure 8A:
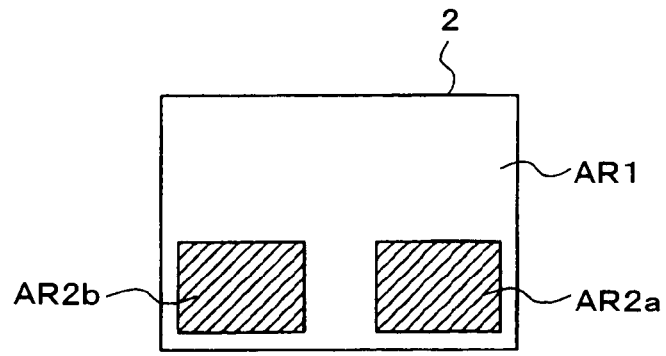
FIG. 8A, FIG. 8B, FIG. 8C, and FIG. 8D are explanatory diagrams of areas of display sections of an embodiment.
Figure 8B:
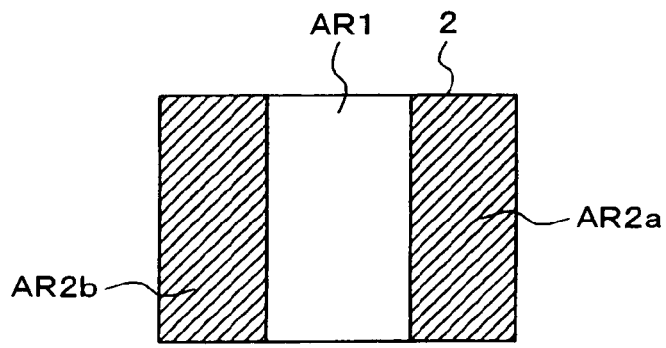
Figure 8C:
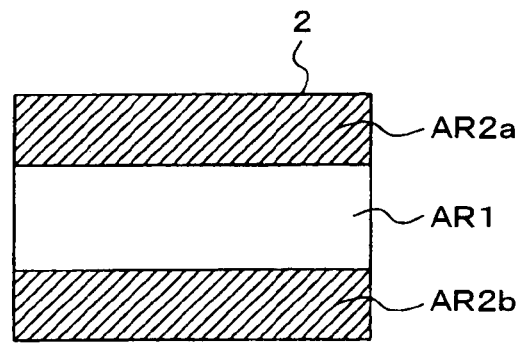
Figure 8D:
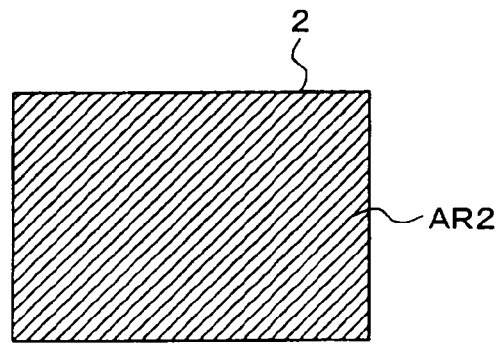

Although FIG. 8D shows an example in which the entire screen area is the area AR2 in which an image corresponding to a display image signal is displayed, for example, the display state shown in FIG. 7A, FIG. 7B, FIG. 7C, FIG. 7D, FIG. 7E, or FIG. 7F may be switched to the display state in which an image is displayed without the through-state area as shown in FIG. 8D.

FIG. 8A shows an example in which two child areas AR2a and AR2b are set at the lower right and lower left of the area AR1, respectively, of the screen area of each of the display sections 2 and an image is displayed on the child areas AR2a and AR2b.

FIG. 8B shows an example in which areas AR2a and AR2b are set at the left and right of the area AR1, respectively, in the screen area of each of the display sections 2 and an image is displayed on the areas AR2a and AR2b.

FIG. 8C shows an example in which areas AR2a and AR2b are set above and below the area AR1, respectively, in the screen area of each of the display sections 2 and an image is displayed on the areas AR2a and AR2b.

When there are two image capturing functional blocks as shown in FIG. 6, respective images corresponding to captured images of the individual image capturing functional blocks may be displayed on the two areas AR2a and AR2b.

Instead, the areas AR1, AR2a, and AR2b may be equally divided into three areas.

In addition, it can be supposed that an area form is selected or areas are switched under the control of the system controller 10 like the case shown in FIG. 7A, FIG. 7B, FIG. 7C, FIG. 7D, FIG. 7E, and FIG. 7F.

In addition, the state shown in FIG. 8A, FIG. 8B, or FIG. 8C may be switched to the state in which an image is displayed on the entire screen as shown in FIG. 8D.

Even if there are a plurality of display image sources of the plurality of image capturing functional blocks and the communication section 26, it can be contemplated that one of them is selected and an image thereof is displayed in the area forms as shown in FIG. 7A, FIG. 7B, FIG. 7C, FIG. 7D, FIG. 7E, and FIG. 7F.

When the display apparatus 1 is structured to have three or more display image sources, three or more areas AR2 may be set and images from the respective display image sources may be displayed thereon at the same time.

When the display sections 2 are used for the right eye and the left eye of the user as shown in FIG. 1A, it can be contemplated that the entire screen of one display section 2 is the through-state and that of the other display section 2 displays an image as shown in FIG. 8D.

[4. Exemplary Display Operation]

In the display apparatus 1 having the structures shown in FIG. 4, FIG. 5, and FIG. 6, an image signal processed in the display image processing section 12 and supplied to the display driving section 13 is a display image signal that is finally displayed on the display sections 2. In particular, this display image signal is displayed on a part of an area on the screen while the through-state area is left as described with reference to FIG. 7A, FIG. 7B, FIG. 7C, FIG. 7D, FIG. 7E, FIG. 7F, and FIG. 8A, FIG. 8B, FIG. 8C, and FIG. 8D. In addition, a display image signal is a signal of an image of a scene different from a scene (namely, a scene that the user sees in the through-state) through the display sections 2.

Although an image as a display image signal is an image captured by the image capturing section 3 (or 3X, 3Y) or an image received by the communication section 26, display image signals from sources of these sections are images of scenes different from a scene that the user sees in the through-state and while the user is seeing an external scene through the through-state area, he or she sees a display image through a part of an area such that the user's visual sense is extended.

Next, various exemplary operations under the control of the system controller 10 will be described.

Figure 9:
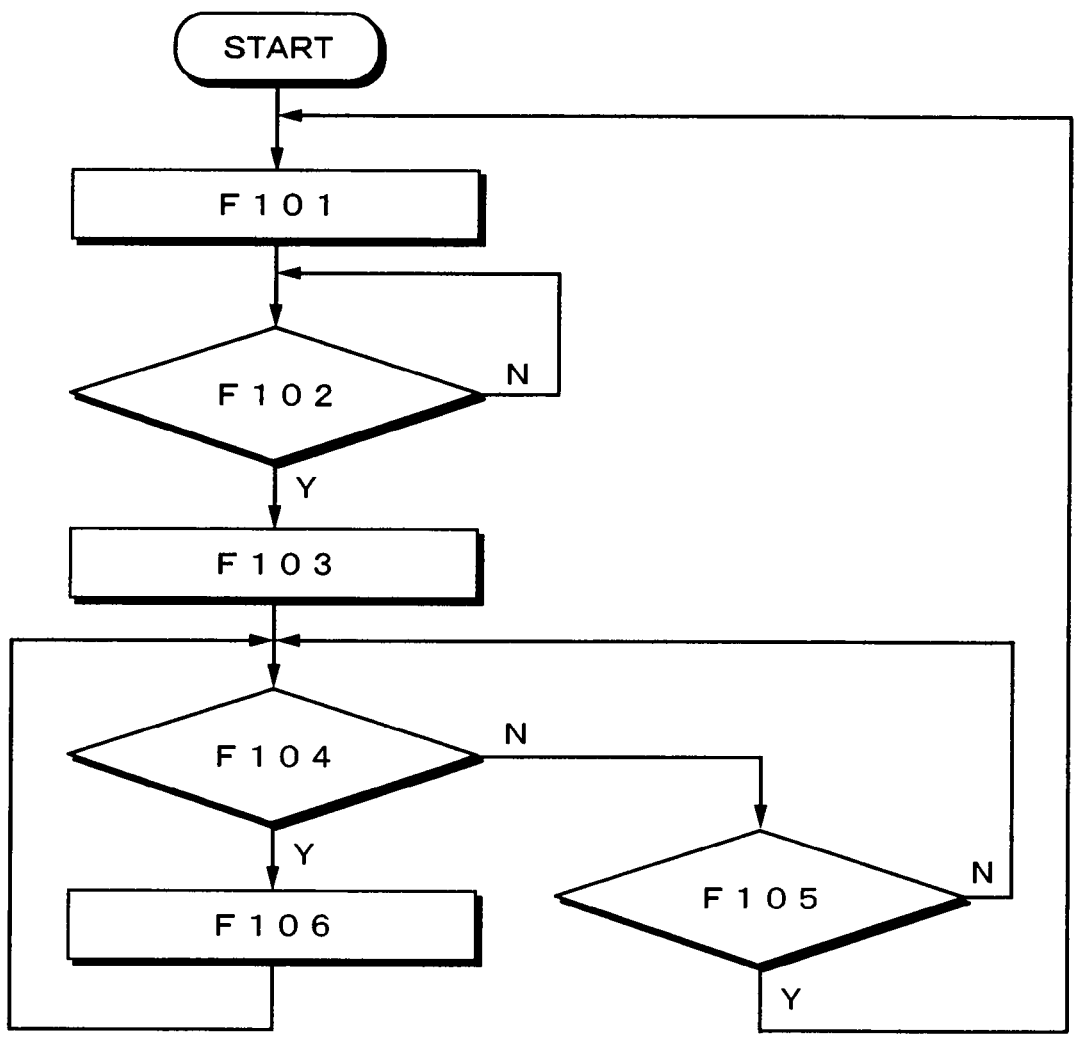
FIG. 9 is a flow chart of a control process of an embodiment.

FIG. 9 shows a control process of the system controller 10.

Step F101 shows a control process in which the system controller 10 controls the display control section 14 to cause the display sections 2 to be in the through-state. For example, in the initial phase when the display apparatus 1 is turned on, the system controller 10 controls the display sections 2 to be in the through-state at step F101.

While the entire screen of each of the display sections 2 is caused to be in the through-state, the system controller 10 determines whether or not a display start trigger has occurred at step F102. For example, by providing an operation switch that the user can operate as the operation trigger information generation section 16 and causing the user to operate a predetermined switch, it can be determined that a trigger that starts the display state have occurred. Instead, as will be exemplified later, by causing the operation trigger information generation section 16 to detect the user's situation and external situation, the system controller 10 may determine that a display start trigger has occurred corresponding to a predetermined condition.

When the determined result denotes that a display start trigger have occurred, the system controller 10 causes the process to advance to step F103 and executes the display start control for the display image signal. In other words, the system controller 10 controls the display sections 2 to display an image signal captured by the image capturing section 3 (or 3X, 3Y) or a display image signal based on an image signal received by the communication section 26. In addition, at this point, for example, as described in FIG. 7A, FIG. 7B, FIG. 7C, FIG. 7D, FIG. 7E, FIG. 7F, and FIG. 8A, FIG. 8B, FIG. 8C, and FIG. 8D, an image is displayed on a part of an area of the screen.

After the image is displayed, namely, while a part of the screen of each of the display sections 2 is caused to be through-state area and another part is an area on which an image is displayed, the system controller 10 monitors whether or not a display switching trigger has occurred at step F104 and whether or not a display end trigger has occurred at step S105.

Occurrence of the display switching trigger at step F104 means that the system controller 10 has determined that display images be switched based on the user's operation, user's situation, or external situation.

Switching of display images includes, for example, switching of display images and switching of area.

It can be contemplated that switching of display images includes remarkably-various examples, for example, changing of images by a zoom process and changes of focus positions in the image capturing section 3, changes of images by changes of image capturing sensitivities, changes of images by signal processes in the captured image signal processing section 15, changes of images by changes of image capturing directions (directions of objects) when the image capturing section 3 is a movable camera, changes of images by signal processes of the display image processing section 12, and changes of images by switching of sources when there are a plurality of sources of display image signals.

The switching of area forms includes changes of positions of parent and child screens, switching of parent and child screens, changes of positions and switching of areas of divided screens, switching to a full screen display, and so forth and is controlling, for example, switching from the state shown in FIG. 7A to the state shown in FIG. 7B, switching from the state shown in FIG. 7A to the state of FIG. 7E, or switching from the state shown in FIG. 7A to the state shown in FIG. 8D.

With respect to the display end trigger at step F105, for example, when the user performs a display end operation with a predetermined operation switch, the system controller 10 can determine that a display state end trigger has occurred; instead, the user's situation or external situation is detected, and the system controller 10 may determine that a display end trigger has occurred according to a predetermined condition.

When the determined result denotes that an image control trigger has occurred, the system controller 10 causes the process to advance from step F104 to step F106 and controls switching for image display operations. Thus, images displayed on a part of an area or area forms of each of the display sections 2 are switched.

After the system controller 10 has controlled display switching at step F106, the system controller 10 monitors whether or not a trigger has occurred at steps F104 and F105.

When the determined result denotes that a display end trigger has occurred, the system controller 10 returns the process from step F105 to step F101 and causes the display control section 14 to end the image display and cause the entire surface of each of the display sections 2 to be in the through-state.

While the user is wearing the display apparatus 1 and its power is being turned on, the system controller 10 performs a control process, for example, as shown in FIG. 9.

In this process, an image is displayed at step F103 and display switching is performed at step F106 and exemplary images displayed in these processes will be described with reference to FIG. 10A and FIG. 10B, FIG. 11A and FIG. 11B, FIG. 12A and FIG. 12B, FIG. 13A and FIG. 13B, FIG. 14A and FIG. 14B, and FIG. 15A, FIG. 15B, FIG. 15C, and FIG. 15D.

In FIG. 10A and FIG. 10B, FIG. 11A and FIG. 11B, FIG. 12A and FIG. 12B, FIG. 13A and FIG. 13B, and FIG. 14A and FIG. 14B, it is assumed that basically with the exemplary structure shown in FIG. 4, the image capturing section 3 is structured to capture an image of a scene in front of the user, namely, in the same direction as a scene that he or she sees through the through-state area.

Figure 10A:
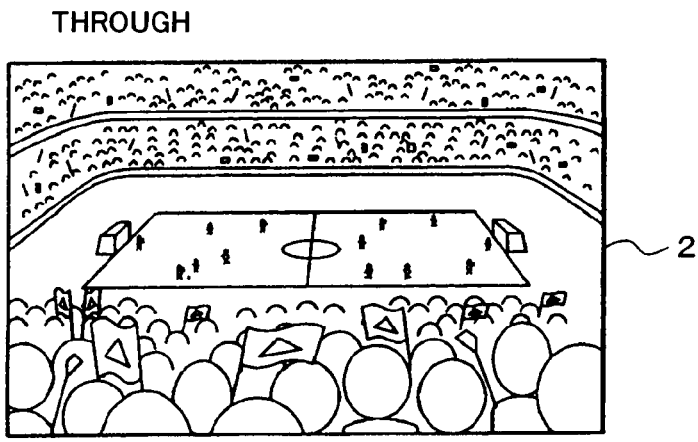
FIG. 10A and FIG. 10B are explanatory diagrams of image display states of an embodiment.

It is assumed that FIG. 10A shows the case in which the entire surface of each of the display sections 2 is the through-state. In other words, the display sections 2 are simply transparent plate members and the user sees a visual scene through the transparent display sections 2.

Figure 10B:
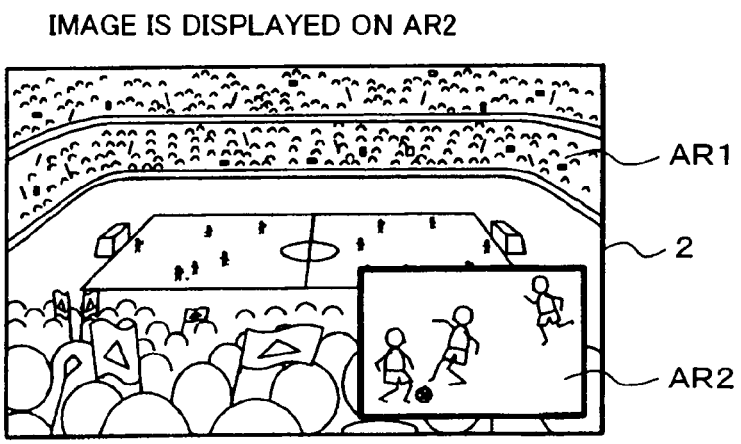

FIG. 10B shows an image display state in which an image captured, for example, by the image capturing section 3 is displayed on the display sections 2. In this example, the area AR1 is caused to be in the through-state, whereas the area AR2 displays an image. In this case, assuming that the image capturing section 3 captures an image in front of the user, when the image capturing section 3 is zoom-controlled to capture a telescopic image, an image (telescopic image) of a scene that is different from the visual field of the user through the through-state area AR1 is displayed on the area AR2. Thus, while seeing an ordinary scene, the user can enjoy a telescopic image that he or she cannot see with his or her ordinary visual sense.

In this example, although a telescopic image is obtained by the operation of the image capturing section 3, when it is zoomed with a wide angle, an image of a near scene is displayed with a wide angle on the display sections 2. The telescopic, wide angle controls can be performed by a signal process of the display apparatus 15 as well as the zoom-lens drive control of the image capturing section 3.

Instead of the so-called zoom operation, the system controller 10 may cause the image capturing section 3 to change its focus distance so as to capture an image of a near scene or far scene and display the captured image on the area AR2 of each of the display sections 2 (not shown).

Figure 11A:
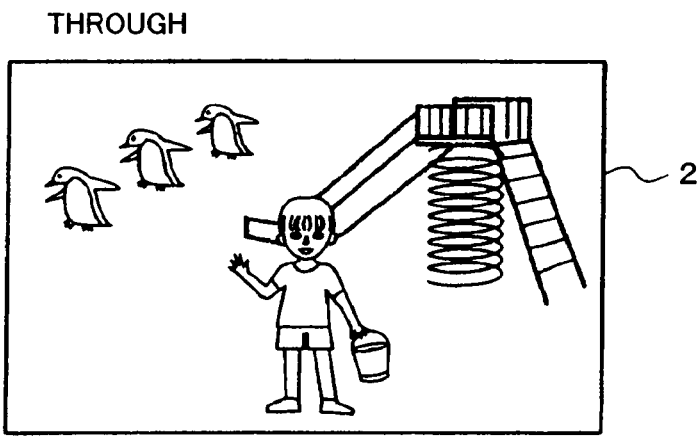
FIG. 11A and FIG. 11B are explanatory diagrams of image display states of an embodiment.

FIG. 11A shows the case in which the entire surface of each of the display sections 2 is caused to be in the through-state.

Figure 11B:
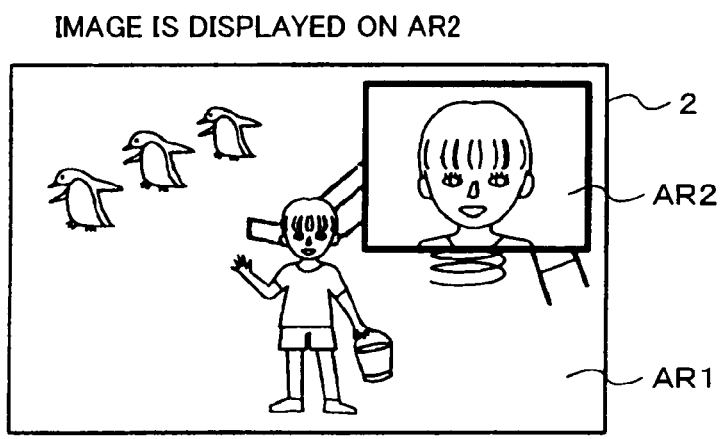

FIG. 11B shows an image display state in which the system controller 10 causes the display control section 14 (display image processing section 12 and display driving section 13) to perform an enlargement process for an image obtained from the image capturing section 3 such that the area AR1 is caused to be in the through-state and the area AR2 displays an enlarged image as shown in FIG. 11B. Since an image of a scene that is different from the user's visual field through the through-area AR1 is displayed as an enlarged image on the area AR2, he or she can see an image that he or she cannot see with his or her ordinary visual sense while seeing an ordinary scene.

In contrast, it can be contemplated that the system controller 10 causes the lighting section 4 (display image processing section 12 and display driving section 13) to execute a reduction process for an image obtained from the image capturing section 3 and display a reduced image on the area AR2.

Figure 12A:
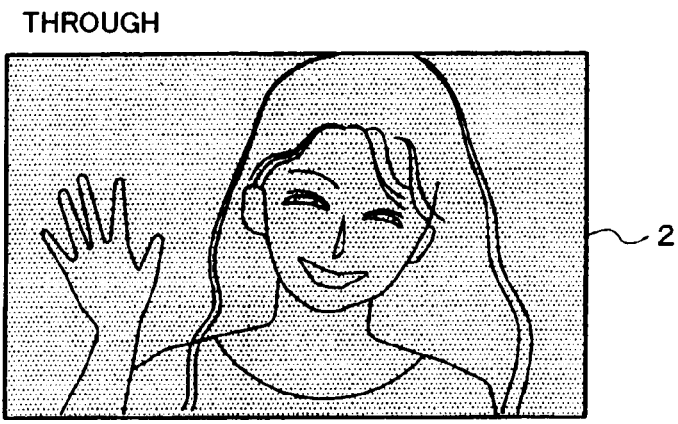
FIG. 12A and FIG. 12B are explanatory diagrams of image display states of an embodiment.

FIG. 12A shows the case in which the entire surface of each of the display sections 2 is caused to be in the through-state and especially the environment is dark.

Figure 12B:
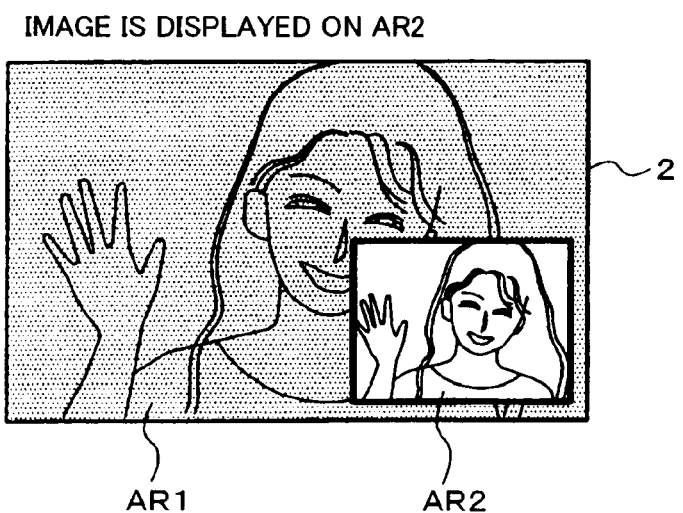

FIG. 12B shows the state in which an image is displayed in the case that the environment is dark and that the system controller 10 causes the image capturing control section 11 (image capturing section 3 and the captured image signal processing section 15) to increase the image capturing sensitivity and the captured image signal processing section 15 and the display image processing section 12 to adjust the luminance level, contrast, and sharpness such that a more clear and bright display image signal is obtained and displayed. In other words, in this example, the area AR1 is caused to be in the through-state and an image whose luminance, namely brightness, is increased is displayed on the area AR2. Since an image of a scene different from the user's visual sight through the through-state area AR1 is displayed as a brightness-adjusted image, the user can see an image that he or she cannot see with his or her ordinary visual sense.

Instead, when the lighting section 4 is caused to perform the lighting operation, such an image can be preferably captured.

In contrast, when the environment is too bright, it can be contemplated that the system controller 10 causes the image capturing control section 11 (image capturing section 3 and captured image signal processing section 15) to decrease the image capturing sensitivity and the captured image signal processing section 15 and the display image processing section 12 to adjust luminance level, contrast, and sharpness such that a non-glaring display image signal is obtained and displayed.

Figure 13A:
FIG. 13A and FIG. 13B are explanatory diagrams of image display states of an embodiment.

FIG. 13A shows the state in which although the entire surface of each of the display sections 2 is caused to be in the through-state, for example, the user is staying in a dark bed room where a child is sleeping, the user cannot clearly see anything nearly in the dark.

Figure 13B:
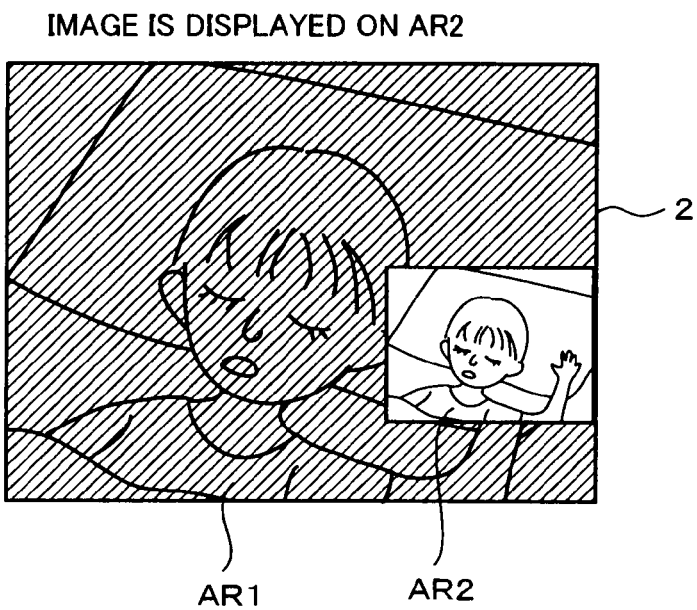

FIG. 13B shows the state in which an image is displayed. When the system controller 10 causes the image capturing control section 11 (image capturing section 3 and captured image signal processing section 15) to increase the infrared image capturing sensitivity, an image whose infrared image capturing sensitivity is increased is displayed on the area AR2. In other words, an image is displayed such that the user can see the child's sleeping face and so forth. Thus, the user can see a night vision image that he or she cannot see with his or her ordinary visual sense.

Figure 14A:
FIG. 14A and FIG. 14B are explanatory diagrams of image display states of an embodiment.

FIG. 14A shows the case in which the entire surface of each of the display sections 2 is caused to be in the through-state.

Figure 14B:
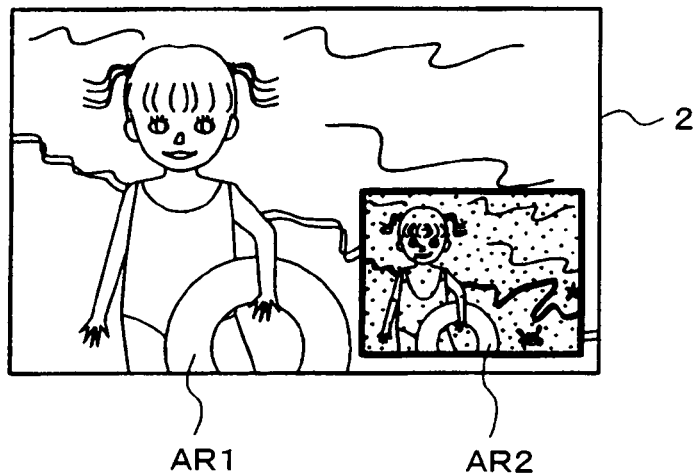

FIG. 14B shows the state in which although an image is displayed, when the system controller 10 causes the image capturing control section 11 (image capturing section 3 and captured image signal processing section 15) to increase the ultraviolet image capturing sensitivity, an image whose ultraviolet image capturing sensitivity is increased is displayed on the area AR2. Thus, the user can see an image of an ultraviolet component that he or she cannot see with his or her ordinary visual sense.

Although FIG. 10A and FIG. 10B; FIG. 11A and FIG. 11B; FIG. 12A and FIG. 12B; FIG. 13A and FIG. 13B; and FIG. 14A and FIG. 14B show examples in which the image capturing section 3 structured shown in FIG. 4 is disposed such that it captures an image in front of the user, FIG. 15A, FIG. 15B, FIG. 15C, and FIG. 15D show examples in which the image capturing section 3 shown in FIG. 4 (or image capturing sections 3X and 3Y shown in FIG. 6) is disposed such that it captures an image in a direction different from the forward direction that the user sees.

Figure 15A:
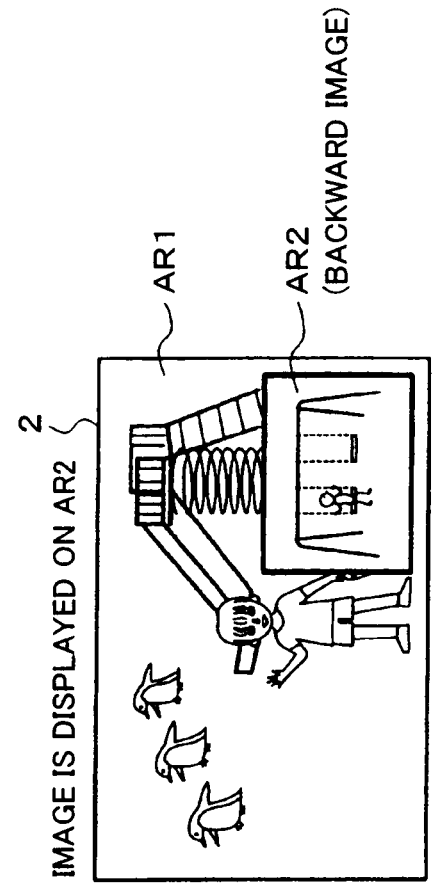
FIG. 15A, FIG. 15B, FIG. 15C, and FIG. 15D are explanatory diagrams of image display states of an embodiment.

FIG. 15A shows the case in which the entire surface of each of the display sections 2 is caused to be in the through-state.

Figure 15B:
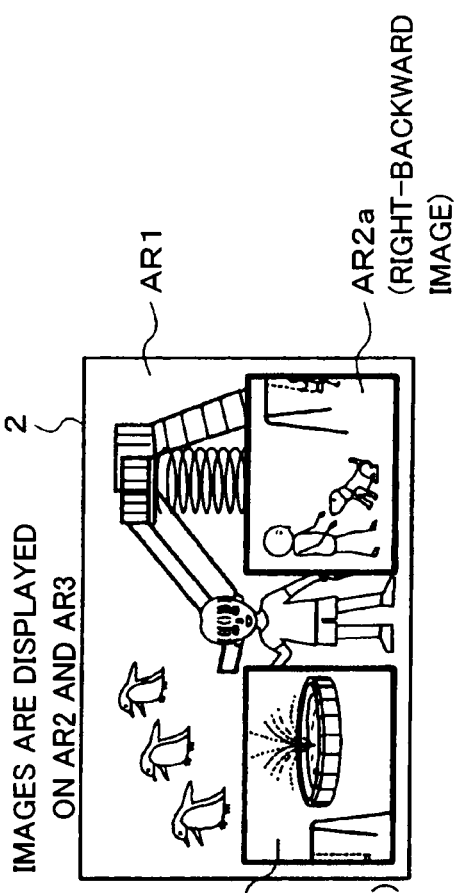

If the image capturing section 3 is disposed such that it captures an image in the rear of the user, the image is displayed as shown in FIG. 15B where the area AR1 is caused to be in the through-state and the image in the rear of the user is displayed on the area AR2.

Figure 15C:
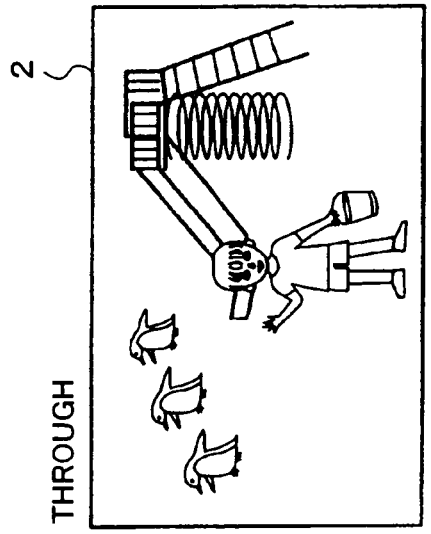

If the image capturing section 3 is disposed such that it captures an image in the upper direction of the user, the image is displayed as shown in FIG. 15C where the area AR1 is caused to be in the through-state and the image captured in the upper direction of the user is displayed on the area AR2.

In these cases, since an image of a scene different from the user's visual field through the through-state area AR1 is displayed on the area AR2, while he or she is seeing a scene in his or her forward direction, he or she can see an image in a direction that he or she cannot see with his or her ordinary visual sense (backward image and upward image).

Figure 15D:
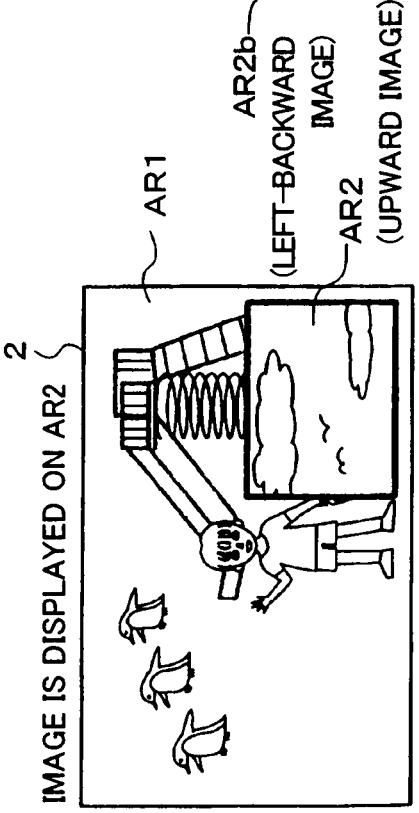

FIG. 15D shows an exemplary image display in which the image capturing sections 3X and 3Y structured to have the plurality of image capturing functional blocks shown in FIG. 6 are disposed such that they capture images in the user's right backward direction and left backward direction, respectively. In other words, the area AR1 is caused to be in the through-state and images captured in the user's right backward direction and left backward direction are displayed on the areas AR2a and AR2B, respectively.

In this case, since images of scenes different from the user's visual field through the through-state area AR1 are displayed on the areas AR2a and AR2b and the user can see scenes in his or her right backward direction and left backward direction in addition to the ordinary forward scene on the through-state area AR1, he or she can check for nearly all circumference.

Although various display examples have been described, they are just exemplary. In this embodiment, by controlling the processes and operations of the image capturing section 3 (3X, 3Y), captured image signal processing section 15, display image processing section 12, display driving section 13, and communication section 26, various display forms are accomplished.

Next, exemplary image signals displayed along with the through-state area on the screen, namely exemplary display image signals that cause images to be displayed as scenes different from a scene that the user sees through the display sections 2 caused to be in the through-state, will be described.

First, when the image capturing section 3 structured as shown in FIG. 4 is disposed such that it captures an image in the forward direction of the user (namely, the image capturing section 3 captures an image of a scene that the user can see in the through-state), examples of display image signals based on a captured image signal obtained in the image capturing section 3 are as follows:

a display image signal as a telescopic zoom image obtained by the zoom operation of the image capturing section 3, a display image signal as a wide zoom image obtained by the zoom operation of the image capturing section 3, a display image signal as a distant view image obtained by the focus control operation of the image capturing section 3, a display image signal as a near view image obtained by the focus control operation of the image capturing section 3, a display image signals as a high speed captured image and a low speed captured image obtained by changing capturing frame rates of the image capturing section 3, a display image signal for which the enlargement process has been performed as a signal process of the captured image signal processing section 15 or the display image processing section 12, a display image signal for which the reduction process has been performed as a signal process of the captured image signal processing section 15 or the display image processing section 12, a display image signal as an image whose brightness has been strengthened by increasing the image capturing sensitivity of the image capturing section 3, a display image signal as an image whose brightness has been suppressed by decreasing the image capturing sensitivity of the image capturing section 3, a display image signal as a night vision image obtained by increasing the infrared image capturing sensitivity of the image capturing section 3, a display image signal as an image obtained by increasing the ultraviolet image capturing sensitivity of the image capturing section 3, a display image signal as an image captured by the image capturing section 3 such that a particular wavelength band is cut, a display image signal as an image whose brightness has been strengthened by increasing the luminance in a signal process of the captured image signal processing section 15 or the display image processing section 12, a display image signal as an image whose brightness has been suppressed by decreasing the luminance in a signal process of the captured image signal processing section 15 or the display image processing section 12, a display image signal as an image whose hue and atmosphere have been changed in the color signal process of the captured image signal processing section 15 or the display image processing section 12, a display image signal as an image whose contrast, sharpness, and so forth have been adjusted in the signal process of the captured image signal processing section 15 or the display image processing section 12, a display image signal as an image for which an image effect process such as mosaic/luminance inversion/soft focus/partial emphasis of image/highlight display has been performed as a signal process of the captured image signal processing section 15 or the display image processing section 12, and display image signals obtained in combinations of the foregoing individual operations and signal processes.

When the image capturing section 3 captures an image of a scene in front of the user who can see in the through-state, for example, by obtaining a display image signal in such an operation or process, the display image signal becomes a signal of an image of a scene different from a scene that he or she sees through the display sections 2 caused to be in the through-state.

Of course, it can be contemplated that there are many types of display image signals as "scenes different from the through-state" obtained by the operation of the image capturing section 3, the signal process of the captured image signal processing section 15, and the signal process of the display image processing section 12.

In addition, it can be contemplated that for example the magnification of the zoom process and enlargement/reduction process, levels in image capturing sensitivity, process coefficients of luminance signal process and color signal process, and so forth are changed as desired.

When the image capturing section 3 is disposed such that it captures an image in a direction different from the forward direction of the user, exemplary display image signal based on captured image signals obtained by the image capturing section 3 may be contemplated as follows.

In other words, in this case, since a captured image ordinarily obtained by the image capturing section 3 is a captured image of a scene different from a scene that the user ordinarily sees through the display sections 2 caused to be in the through-state (for example, backward scene, upward scene, downward scene, rightward scene, leftward scene), the captured image signal can be directly displayed as a display image signal on the display sections 2.

In addition, in this case, as described above, an image signal for which the image capturing operation of the image capturing section 3, the signal process of the captured image signal processing section 15, and the signal process of the display image processing section 12 have been performed may be a display image signal.

In addition, these processes can be applied to the case in which a plurality of image capturing functional blocks are provided as shown in FIG. 6. If there is an image capturing section 3 that captures an image in the forward direction in the plurality of image capturing functional blocks, the captured image signal of the image capturing section 3 may be a display image signal of an image signal of a different scene for which the image capturing operation of the image capturing section 3, the signal process of the captured image signal processing section 15, and the signal process of the display image processing section 12 have been performed.

When there is an image capturing section 3 that captures an image in a direction other than the forward direction, the captured image signal can be used as a display image signal or an image signal for which the image capturing operation of the image capturing section 3, the signal process of the captured image signal processing section 15, and the signal process of the display image processing section 12 have been performed can be used as a display image signal.

When there is a movable image capturing section that can change the image capturing direction, likewise, a captured image other than in the forward direction of the user or an image signal for which the image capturing operation of the image capturing section 3, the signal process of the captured image signal processing section 15, and the signal process of the display image processing section 12 have been performed can be used as a display image signal.

In the movable type, moving control that tracks a particular object can be contemplated. For example, an image of a captured image signal is analyzed and when a particular object is detected, the image capturing direction is changed corresponding to the motion of the particular object in the captured image. Such control allows the user to see an image that tracks a particular object, for example, on the area AR2.

It can be contemplated that such processes can be applied to the case in which a captured image of an external image capturing device 70 received by the communication section 26 is displayed.

In other words, since a captured image of the external image capturing device 70 is a captured image of a scene that is different from a scene that the user ordinarily sees through the display sections 2 caused to be in the through-state, by directly displaying an image signal received by the communication section 26 as a display signal on the display sections 2, the user is provided with a variety of images.

Of course, in such a case, image signals for which the foregoing signal processes of the display image processing section 12 have been performed may be display image signals.

For example, when the user is watching a football game at a stadium seat as shown in FIG. 10A, it can be contemplated that an image that the image capturing device 70 captures at another place of the stadium is received by the communication section 26 and displayed on the area AR2 of each of the display sections 2 as shown in FIG. 10B; when images are received from an image capturing device 70 installed, for example, near a coach seat or an image is received from a small image capturing device 70 that an umpire wears, by displaying the received image on the display sections 2, the user can watch the game with more interest.

Instead, many examples such as an example in which an image captured by an image capturing device 70 installed at a resort area or an image captured by an image capturing device 70 to which an acquaintance who is travelling belongs is received by the communication section 26 and displayed on the area AR2 of the display sections 2 and an example in which a ground image (bird view image) captured by an image capturing device 70 with which an airplane or a satellite is equipped is received by the communication section 26 and displayed on the display area AR2 of each of the display sections 2 can be contemplated and with such a display, the user can enjoy a scene that he or she cannot ordinarily see.

[5. Exemplary Operation Triggers]

As described in the process shown in FIG. 9, when the system controller 10 determines that a display start trigger have occurred at step F102 or a display switching trigger have occurred at step F104, the system controller 10 executes displaying. When the system controller 10 determines that a display end trigger have occurred at step F105, the system controller 10 ends displaying.

Although triggers with respect to these display operations can occur corresponding to user's operations, the system controller 10 detects a user's situation and an external situation and determines whether or not a trigger has occurred corresponding to a predetermined condition as described above.

Here, examples in which it is determined whether or not a trigger has occurred based on a user's situation and an external situation will be described.

When it is determined whether or not a trigger has occurred corresponding to a user's situation, the display apparatus 1 is provided with as the operation trigger information generation section 16 a visual sensor, an acceleration sensor, a gyro, a biological sensor, and so forth.

Although the visual sensor detects information about a user's visual sense, the visual sensor can be composed of an image capturing section that is disposed near one of the display sections 2 and is caused to capture an image of his or her eye. By causing the system controller 10 to fetch and analyze the image of the eye of the user captured by the image capturing section, a visual line direction, a focus distance, a dilation of pupils, an eye fundus pattern, eyelid opening/closing, and so forth can be detected and thereby his or her situation and intention can be determined based on the detected results.

Instead, the visual sensor may be composed of a light emitting section that is disposed near one of the display sections 2 and that emits light to the eye of the user and a light receiving section that receives light reflected from the eye. By detecting the thickness of the lens of the user's eye, for example, with a signal corresponding to the received light, the focus distance of the user's eye can be detected.

By detecting the visual line direction of the user, the system controller 10 can determine a portion on which the user is focusing, for example, in an image displayed on the display sections 2.

In addition, the system controller 10 can recognize the visual line direction of the user as an operation input. For example, when the user moves the visual line to the left and right, the system controller 10 can recognize these operations as predetermined operation inputs to the display apparatus 1.

By detecting the focus distance of the user, the system controller 10 can determine whether a scene on which the user is focusing is far or near and perform zoom control, enlargement control, reduction control, and so forth corresponding to the determined result. For example, when the user sees a far scene, the system controller 10 may perform the telescopic display operation.

When the dilation of the user's pupil is detected in the through-state, the brightness of the surroundings can be determined; when the dilation of the user's pupil is detected in the monitor display state, the glare and so forth that the user feel for an image that is displayed can be determined and the luminance, the image capturing sensitivity, and so forth can be adjusted corresponding to the determined results.

Detection of the eye fundus pattern of the user can be used for personal authentication of the user. Since the eye fundus pattern is unique for each user, he or she who wears the display apparatus 1 can be identified corresponding to the eye fundus pattern and control can be performed corresponding to him or her or control can be performed such that a display operation is performed for only a particular user.

When the eyelid opening/closing operations of the user are detected, the glare and eyestrain that he or she feels can be determined. In addition, the opening/closing operations of the eyelids can be recognized as user's intentional operation inputs. When the user has performed the eyelid opening/closing operations three times, these operations may be determined as a predetermined operation input.

The acceleration sensor and the gyro output signals corresponding to the motion of the user. For example, it is suitable that the acceleration sensor detects a motion in the linear direction and the gyro detects a motion and a vibration of a rotating system.

The acceleration sensor and the gyro can detect a motion of the whole or a part of the body of the user although depending on the positions where they are disposed.

When the acceleration sensor and the gyro are disposed in the eyeglass-type display apparatus 1 shown in FIG. 1A and FIG. 1B, namely when the acceleration sensor and the gyro detect a motion of the head of the user, information of the acceleration sensor is acceleration information as the motion of the user's head or his or her whole body, whereas the information of the gyro is information of an angular velocity and a vibration as a motion of the user's head or his or her whole body.

Thus, an action of which the user moves the head from the neck can be detected. For example, the state in which the user is looking up and the state in which he or she is looking down can be determined. When the user is looking down, it can be determined that he or she is seeing a near object, for example, he or she is reading a book or the like. In contrast, when the user is looking up, it can be determined that he or she is seeing a far object.

When the system controller 10 has detected a user's moving action of the head from the neck, the system controller 10 may recognize it as a user's intentional action. For example, if the user has shaken his or her neck to the left twice, the system controller 10 can determine the action as a predetermined operation input.

The acceleration sensor and the gyro can determine whether the user is in a stop state (non-walking state), a walking state, or a running state. In addition, the acceleration sensor and the gyro can detect changes of states from a standing state to a sitting state or vice versa.

When the acceleration sensor and the gyro are separated from the headgear-type mounting unit and mounted on an arm or a foot of the user, they can detect the motion of only the arm or foot.

Although the biological sensor detects as user's biological information, for example, heart rate information (heart rate), pulse rate information (pulse rate), perspiration information, cerebral wave information (information of for example α wave, β wave, θ wave, and δ wave), galvanic skin response, body temperature, blood pressure, respiratory activity (for example, speed and depth of breathing, amount of ventilation, etc.), and so forth of the user, the system controller 10 can determine whether he or she is a tense state, an excited state, a calm state, a drowsy state, a comfortable state, an uncomfortable state, or the like corresponding to these kinds of information.

In addition, it can be determined that the user have worn the display apparatus 1 corresponding to biological information. For example, when the user is not wearing the display apparatus 1, the system controller 10 may control the display apparatus 1 to operate in a standby state in which only biological information is detected. When the system controller 10 has detected that the user has worn the display apparatus 1 corresponding to the detected biological information, the system controller 10 may turn on the power of the display apparatus 1. In contrast, when the user has taken off the display apparatus 1, the system controller 10 may control the display apparatus 1 to be restored to the standby state.

In addition, information detected by the biological sensor can be used to personally authenticate the user (identify the user who has worn the display apparatus 1).

When the biological sensor is disposed in the mounting frame of the eyeglass-type display apparatus 1, the foregoing information may be detected at the bilateral temporal region or the occipital region of the user or the biological sensor may be separated from the mounting frame of the display apparatus 1 and disposed at a predetermined position of the user's body.

When an external situation is detected, as a structure that obtains external information, the display apparatus 1 is provided with surrounding environment sensors, an image capturing target sensor, a GPS receiving section, a date and time counting section, and an image analyzing section in the operation trigger information generation section 16 or the communication section 26 is used.

The surrounding environment sensors are supposed to be a luminance sensor, a temperature sensor, a humidity sensor, an atmospheric pressure sensor, and so forth.

The luminance sensor may detect information about the surrounding brightness of the display apparatus 1.

The temperature sensor, humidity sensor, and atmospheric pressure sensor can obtain information with which the temperature, humidity, atmospheric pressure, and weather can be determined depending on their types.

Since these surrounding environment sensors can determine the surrounding brightness, outdoor weather situation, and so forth, the system controller 10 can execute and control a generation operation of a display image signal suitable for the surrounding brightness and weather situation using these information as the external information. For example, the luminance level is increased or decreased corresponding to the brightness of the surroundings while the atmosphere of an image is changed corresponding to the weather condition.

The image capturing target sensor detects information about the image capturing target. Although the image capturing target sensor can be contemplated to be a distance measurement sensor or a pyroelectric sensor, the distance to an image capturing target and information with which the image capturing target is determined can be obtained.

By detecting the distance to the image capturing target, the system controller 10 can execute and control the image capturing operation and the display operation corresponding to the detected distance. By detecting that the image capturing target is a living body such as a human, the system controller 10 can execute and control a generation operation of a display image signal corresponding to the image capturing target.

The GPS receiving section obtains information of latitude and longitude of the current position. When the latitude and longitude of the current position have been detected, with reference to a map database or the like, information about the current position (information about the neighborhood of the current position) can be obtained. When a record medium (such as a HDD (Hard Disk Drive) or a flash memory) that has a relatively large recording capacity is mounted as a record medium to which the system controller 10 can refer and the record medium has stored a map database, information about the current position can be obtained.

Even if the display apparatus 1 is not provided with a built-in map database, when the display apparatus 1 is structured to have the communication section 26, the display apparatus 1 may cause the communication section 26 to access for example a network server or a device having a built-in map database, transmit information of latitude and longitude of the current position to the network server or the device, request the network server or the device to transmit information about the current position to the communication section 26, and receive the information.

Information associated with the current position includes place names, building names, facility names, store names, station names, and so forth in the vicinity of the current position.

In addition, information associated with the current position includes information representing the types of structures such as parks, theme parks, concert halls, theaters, movie theaters, sports facilities, and so forth.

In addition, information associated with the current position includes types and names of natural things such as seashores, ocean surfaces, rivers, mountains, mountain tops, forests, lakes, plains, and so forth.

As information about more detailed positions, areas in theme parks, seat areas of baseball stadiums, soccer stadiums, etc., seat areas of concert halls, and so forth can be obtained as information about the current position.

By obtaining information about the current position, the system controller 10 can execute and control a generation operation of a display image signal and perform display start control or display end control at particular positions corresponding to the current position, geographic conditions, facilities, and so forth in the vicinity of the current position.

The date and time counting section counts, for example, the years, months, days, hours, minutes, and seconds. The system controller 10 can recognize the current time, day or night, month, season, and so forth corresponding to the counted results of the date and time counting section. Thus, the system controller 10 can execute and control a generation operation for a display image signal corresponding, for example, to day or night (time) and that corresponding to the current season.

When an image analyzing section that analyzes a captured image is provided, the following various types of information about an image capturing target can be detected from a captured image.

First, a person, an animal, a natural thing, a building, a machine, and so forth can be identified as types of image capturing targets from a captured image. As animals, a situation in which a bird has been captured as an object, a situation in which a cat has been captured as an object, and so forth can be identified. As natural things, sea, mountains, trees, rivers, lakes, sky, sun, moon, and so forth can be identified. As structures, houses, buildings, stadiums, and so forth can be identified. As devices, situations in which a personal computer, an AV (Audio Visual) device, a mobile phone, a PDA, an IC card, a two-dimensional bar code, and so forth are image capturing targets can be identified.

When characteristics of the shapes of various types of image capturing targets are pre-registered, it can be determined whether or not an object corresponding to the registered characteristics is contained in a captured image.

In addition, the image analyzing section can analyze an image to detect a motion of an object, for example, a quick motion in an image, by detecting the difference of adjacent frames of images. For example, the image analyzing section can detect a situation in which an image of a quickly moving object is being captured, for example, while an image of a player in a sports match or an image of a running car is being captured.

In addition, the image analyzing section can analyze an image to determine a surrounding situation. For example, the image analyzing section can determine the brightness due to day, night, or weather and also can recognize the strength of rain and so forth.

In addition, when a person is an object, the image analyzing section can analyze an image to identify the person from the face. As well known, a person's face can be registered as personal characteristic data that are relative position information of structural elements of the face. For example, the ratio (Ed/EN) of the distance EN between the center of the eyes and the nose and the distance Ed of the eyes and the ratio (Ed/EM) of the distance EM between the center of the eyes and the mouth and the distance Ed of the eyes are unique to each person and are not affected by changes in appearance with a hair style and wearing things such as eyeglasses and so forth. In addition, it is known that they do not change with aging.

Thus, when a captured image contains a person's face, the image analyzing section can analyze the image to detect the foregoing personal characteristic data.

When personal characteristic data have been detected from a captured image, if for example a HDD (Hard Disk Drive), a flash memory, or the like has been provided as a record medium to which the system controller 10 can refer and that has stored a persons database, personal information of the object can be obtained from the persons database. Even if the display apparatus 1 does not have a built-in persons database, the system controller 10 may cause the communication section 26 to access for example a network server or a device having a built-in persons database, transmit personal characteristic data so as to request the server or device to transmit information to the communication section 26, and receive particular personal information therefrom.

If the user has registered personal information such as the name, organization, and so forth of each person whom the user had met to the persons database along with personal characteristic data, when the user meets a particular person (his or her image has been captured), the system controller 10 can retrieve information about the person from the persons database.

If a persons database that has registered information about famous people and personal characteristic data has been prepared, when the user meets a famous person, the system controller 10 can retrieve information about the person from the persons database.

Based on the detection information of the image analysis section, the system controller 10 can execute and control a generation process for a display image signal corresponding to a capturing object. For example, when an image of a particular object or a particular person is captured, it can be contemplated that a display image signal that highlights the particular object is generated.

The communication section 26 can obtain various types of information as external information.

For example, as described above, the communication section 26 can obtain information retrieved by an external device corresponding to information of latitude and longitude, personal characteristic data, and so forth transmitted from the display apparatus 1.

In addition, the communication section 26 can obtain meteorological information such as weather information, temperature information, and humidity information from an external device.

In addition, facility use information, photography prohibition/permission information, facility guide information, and so forth can be obtained from an external device.

In addition, identification information of an external device itself can be obtained. Examples of identification information include a device type, a device ID, and so forth of a device identified as a network device in a predetermined communication protocol.

In addition, image data that are stored in an external device, image data that are being reproduced or displayed by an external device, and image data that are being received by an external device can be obtained.

Based on information obtained by such a communication section 26, the system controller 10 can execute and control a generation process for a display image signal.

When the foregoing exemplified structural element is provided as the operation trigger information generation section 16, the user's situation and external situation are detected, and display start/end and display switching (changes of display contents and switching of area forms), a display operation that is appropriate or interesting is accomplished without necessity of a user's operation.

Other exemplary structures that detect user's situation and an external situation can be contemplated.

[6. Effect of Embodiment, Exemplary Modification, and Exemplary Extension]

Although embodiments of the present invention have been described, according to the embodiments of the present invention, by causing a part of the display area of each of the display sections 2 to be in the through-state and a display image signal to be displayed, while the user sees an ordinary scene in the through-state area, he or she can see an image of a scene different from a scene that he or she ordinarily sees. For example, while the user is seeing ahead through a through-state area, he or she can see a telescopic image, an enlarged image, a specially captured image, an image of a rear scene, or the like with displaying of a display image signal. Thus, a situation in which the user sees a scene that he or she cannot see with his or her ordinary visual sense along with an ordinary scene takes place and thereby a situation in which the user's visual ability is pseudo-extended can be created.

In addition, since at least a part of the screen area of each of the display sections 2 is caused to be in the through-state, the user who wears the display apparatus 1 can live free of difficulties. Thus, in a user's ordinary life, the benefits of the display apparatus 1 can be effectively obtained.

The appearance and structure of the display apparatus 1 are not limited to the examples shown in FIG. 1A and FIG. 1B, FIG. 2A and FIG. 2B, FIG. 4, FIG. 5, and FIG. 6. Instead, various exemplary modifications can be contemplated.

For example, a storage section that records an image signal captured by the image capturing section 3 to a record medium may be provided.

In addition, an operation that transmits a captured image signal from the communication section 26 to another device may be performed.

If the storage section is provided, a reproduced image obtained from a record medium of the storage section may be displayed as a display image signal on the display sections 2.

Data that are reproduced from a record medium are supposed to be all kinds of data to be recorded on the record medium and displayed such as moving image content including movies and video clips, still image content captured, for example, by a digital still camera and recorded on the record medium, computer use data of electronic books and so forth, image data, text data, spreadsheet data, and so forth that the user has created with a personal computer and recorded on the record medium, game images based on game programs recorded on the record medium, and so forth.

It can be contemplated that the communication section 26 receives not only an image signal from the external image capturing device 70, but an image provided by an external content source device (moving image/still image) and displays the image on the display sections 2.

The content source device can be, for example, an AV (audio-Visual) device such as a video device, a television tuner, a home server device or an information processing device such as a personal computer, a PDA (personal digital Assistant), or a mobile phone. Such a content source device can be contemplated to be one of a variety of devices to which the user themselves or its acquaintance belongs or a server device to which a public or service company that provides various kinds of content belongs.

Data transmitted from the content resource device to the display apparatus 1 are supposed to be all kinds of data to be displayed such as moving image content including movies and video clips, still image content captured, for example, by a digital still camera and recorded on the record medium, data of electronic books and so forth, computer-use data such as image data, text data, spreadsheet data, and so forth that the user has created with a personal computer and recorded on the record medium, game images, and so forth.

In addition, a microphone that collects a surrounding sound while an image is being captured and an earphone type speaker section that outputs a sound may be provided.

In addition, it can be contemplated that a character recognition section that recognizes characters from an image and a sound synthesis section that performs a sound synthesis process are provided such that if characters are contained in a captured image, the sound synthesis section generates a sound signal of a reading sound and the speaker section outputs the sound signal.

The display image signal may be a still image. For example, a still image is captured at timing of a predetermined trigger and the captured still image is displayed on the display sections 2.

Although the display apparatus 1 is exemplified as an eyeglass-type or headgear-type mounting unit, as long as the display apparatus of the present invention is structured to display an image in front of the eyes of the user, the display apparatus may be any type that the user wears with any mounting unit such as a headphone type, a neckband type, an ear hanging type, or the like. Instead, the display apparatus 1 may be a unit that is attached to eyeglasses, a visor, a headphone, or the like using a mounting member such as a clip.

As described above, according to the embodiments of the present invention, by causing a part of the display area of display means to be in the through-state and a display image signal to be displayed by the display means, while the user can see an ordinary scene in the through-state area, he or she can see an image of a scene different from a scene that he or she ordinarily sees and thereby there is an effect that a situation in which the user's visual ability is pseudo-extended can be created.

In addition, since at least a part of the screen area of the display means is caused to be in the through-state, the user who wears the display apparatus 1 can live free of difficulties. Thus, in a user's ordinary life, the benefits of the display apparatus of the present invention can be effectively obtained.

DESCRIPTION OF REFERENCE NUMERALS

1 DISPLAY APPARATUS
2 DISPLAY SECTIONS
3 IMAGE CAPTURING SECTION
4 LIGHTING SECTION
10 SYSTEM CONTROLLER
11 IMAGE CAPTURING CONTROL SECTION
12 DISPLAY IMAGE PROCESSING SECTION
13 DISPLAY DRIVING SECTION
14 DISPLAY CONTROL SECTION
15 CAPTURED IMAGE SIGNAL PROCESSING SECTION
16 OPERATION TRIGGER INFORMATION GENERATION SECTION
26 COMMUNICATION SECTION
F101 EXECUTE CONTROL FOR DISPLAY AREA TO BE FULL THROUGH-STATE.
F102 HAS DISPLAY START TRIGGER OCCURRED?
F103 EXECUTE DISPLAY START CONTROL FOR IMAGE AT PART OF DISPLAY SECTION.
F104 HAS DISPLAY SWITCHING TRIGGER OCCURRED?
F105 HAS DISPLAY END TRIGGER OCCURRED?
F106 EXECUTE DISPLAY SWITCHING CONTROL.

The invention claimed is:
1. A display apparatus, comprising:
first display means, disposed in front of one eye of a user, for displaying an image in a first screen area and for causing an entire first screen area to be in a through-state;
second display means, disposed in front of the other eye of the user and different from the first display means, for causing an entire second screen area to be in the through-state, the through-state corresponding to a transparent or semi-transparent state of the first screen area and the second screen area, and a state in which a non-imaged scene is seen by the eyes of the user;
image signal generation means for generating a display image signal of a scene different from the scene which the user sees through the first or second display means, when the first or second display means is caused to be in the through-state; and
control means for controlling, based on external information, the second screen area of the second display means to be in the through-state and for controlling, based on the external information, the first display means to transition the first screen area from the through-state to a non-through-state and to execute displaying with the display image signal generated by the image signal generation means to display the image in the first screen area that is in the non-through-state, such that the image displayed in the first screen area that is in the non-through-state is presented to the one eye of the user and the second screen area that is in the through-state is presented to the other eye of the user.

2. The display apparatus as set forth in claim 1,
wherein the image signal generation means includes:
an image capturing section; and
a signal processing section which performs a signal process for a captured image signal obtained by the image capturing section.

3. The display apparatus as set forth in claim 2,
wherein the image capturing section is an image capturing section disposed such that the image capturing section performs capturing in a direction which the user sees through the second display means when the second screen area is caused to be in the through-state as a direction of an object.

4. The display apparatus as set forth in claim 2,
wherein the image capturing section is an image capturing section disposed such that the image capturing section performs capturing in a direction different from a direction which the user sees through the second display means when the second screen area is caused to be in the through-state as a direction of an object.

5. The display apparatus as set forth in claim 2,
wherein the image capturing section is an image capturing section capable of changing a direction of an object.

6. The display apparatus as set forth in claim 2,
wherein the image capturing section controls an operation of an image capturing lens system such that the image signal generation means obtains a display image signal as a scene different from the scene which the user sees when the second display means is caused to be in the through-state.

7. The display apparatus as set forth in claim 2,
wherein the signal processing section performs a signal process such that the image signal generation means obtains a display image signal as a scene different from the scene which the user sees when the second display means is caused to be in the through-state.

8. The display apparatus as set forth in claim 1,
wherein the image signal generation means includes a reception section which receives an image signal from an external device.

9. The display apparatus as set forth in claim 8,
wherein the receiving section receives an image signal captured by an external image capturing device such that the image signal generation means obtains the display image signal as a scene different from the scene which the user sees when the second display means is caused to be in the through-state.

10. The display apparatus as set forth in claim 1,
wherein the image signal generation means includes a signal processing section which performs a signal process for a supplied image signal.

11. The display apparatus as set forth in claim 1,
wherein the display image signal is an image signal obtained by capturing of an image of a near scene or an image of a far scene.

12. The display apparatus as set forth in claim 1,
wherein the display image signal is an image signal obtained by capturing of a telescopic image or a wide-angle image.

13. The display apparatus as set forth in claim 1,
wherein the display image signal is an image signal obtained by an enlargement process or a reduction process.

14. The display apparatus as set forth in claim 1,
wherein the display image signal is an image signal obtained by capturing whose image capturing sensitivity is increased or decreased.

15. The display apparatus as set forth in claim 1,
wherein the display image signal is an image signal obtained by capturing whose infrared image capturing sensitivity is increased.

16. The display apparatus as set forth in claim 1,
wherein the display image signal is an image signal obtained by capturing whose ultraviolet image capturing sensitivity is increased.

17. The display apparatus as set forth in claim 1,
wherein the display image signal is an image signal obtained by capturing in a direction different from a direction which the user sees through the second display means when the second screen area is caused to be in the through-state as a direction of an object.

18. The display apparatus as set forth in claim 1, further comprising:
external information obtaining means for obtaining the external information,
wherein the control means causes the display image signal to be displayed on the first display means based on the external information obtained from the external information obtaining means.

19. The display apparatus as set forth in claim 18,
wherein the control means controls the first screen area on which the display image signal is displayed based on the external information obtained from the external information obtaining means.

20. A display method of a display apparatus having a first display, disposed in front of one eye of a user, for displaying an image in a first screen area and for causing an entire first screen area to be in a through-state, and a second display, disposed in front of the other eye of the user and different from the first display, for causing an entire second screen area to be in the through-state, the display method comprising:
generating a display image signal of a scene different from a scene which the user sees through the first or second display, when the first or second display is caused to be in the through-state, the through-state corresponding to a transparent or semi-transparent state of the first screen area and the second screen area, and a state in which a non-imaged scene is seen by the eyes of the user; and
controlling, based on external information, the second screen area of the second display to be in the through-state and controlling, based on the external information, the first display to transition the first screen area from the through-state to a non-through-state and to execute displaying with the generated display image signal to display the image in the first screen area that is in the non-through-state, such that the image displayed in the first screen area that is in the non-through-state is presented to the one eye of the user and the second screen area that is in the through-state is presented to the other eye of the user.

21. A display apparatus, comprising:
a first display, disposed in front of one eye of a user, configured to display an image in a first screen area and configured to cause an entire first screen area to be in a through-state;
a second display, disposed in front of the other eye of the user and different from the first display, configured to cause an entire second screen area to be in the through-state, the through-state corresponding to a transparent or semi-transparent state of the first screen area and the second screen area, and a state in which a non-imaged scene is seen by the eyes of the user;
an image signal generator configured to generate a display image signal of a scene different from the scene which the user sees through the first display or the second display, when the first display or the second display is caused to be in the through-state; and a controller configured to control, based on external information, the second screen area of the second display to be in the through-state and configured to control, based on the external information, the first display to transition the first screen area from the through-state to a non-through-state and to execute displaying with the display image signal generated by the image signal generator to display the image in the first screen area that is in the non-through-state, such that the image displayed in the first screen area that is in the non-through-state is presented to the one eye of the user and the second screen area that is in the through-state is presented to the other eye of the user.

* * * * *